(12) United States Patent
Kubo et al.

(10) Patent No.: US 8,599,450 B2
(45) Date of Patent: Dec. 3, 2013

(54) IMAGE READ DEVICE AND COPIER

(75) Inventors: Hiroshi Kubo, Kanagawa (JP); Takashi Fujii, Kanagawa (JP); Yasuo Kosuga, Kanagawa (JP); Tatsuaki Nagano, Kanagawa (JP); Kenichiro Morita, Kanagawa (JP); Takeshi Akai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 13/138,573

(22) PCT Filed: Mar. 11, 2010

(86) PCT No.: PCT/JP2010/054617
§ 371 (c)(1),
(2), (4) Date: Sep. 7, 2011

(87) PCT Pub. No.: WO2010/104212
PCT Pub. Date: Sep. 16, 2010

(65) Prior Publication Data
US 2012/0002252 A1 Jan. 5, 2012

(30) Foreign Application Priority Data
Mar. 12, 2009 (JP) ................................. 2009-059422

(51) Int. Cl.
*H04N 1/04* (2006.01)
(52) U.S. Cl.
USPC ...... 358/498; 358/497; 358/474; 271/258.03; 399/367
(58) Field of Classification Search
USPC ......... 358/474, 475, 498, 497, 496, 486, 296, 358/516, 461, 449, 462; 271/10.01, 258.03, 271/265.01; 399/367
See application file for complete search history.

(56) References Cited

U.S. PATENT DOCUMENTS 5,006,904 A * 4/1991 Matsuo et al. .................. 399/86
5,749,570 A * 5/1998 Iwata et al. ................ 271/10.13

(Continued)

FOREIGN PATENT DOCUMENTS

| CN | 1420682 | 5/2003 |
| JP | 2000-113163 | 4/2000 |

(Continued)

OTHER PUBLICATIONS

Abstract of JP 2001-272829 published Oct. 5, 2001.

(Continued)

*Primary Examiner* — Negussie Worku
(74) *Attorney, Agent, or Firm* — Harness, Dickey & Pierce, P.L.C.

(57) ABSTRACT

An image read device is provided, which conveys an original while performing reading of an image of the original at a read position on a transparent member by a read unit fixed, the image read device including: a moving unit that moves the transparent member back and forth in an original conveying direction; a control unit that conveys the original and moves the transparent member by using the moving unit while causing the reading of the image to be performed at the read position; and a determining unit that, when an event causing interruption of original conveyance occurs, stops the transparent member and determines whether a control of returning the transparent member to a home position is to be performed or not in accordance with a stopped position of the original in an original conveying path.

9 Claims, 18 Drawing Sheets

(56) References Cited

U.S. PATENT DOCUMENTS

| | | | |
|---|---|---|---|
| 5,930,008 | A | 7/1999 | Nabeshima et al. |
| 6,059,285 | A * | 5/2000 | Suga et al. .................... 271/228 |
| 6,123,403 | A * | 9/2000 | Makino et al. .................... 347/5 |
| 6,934,507 | B2 * | 8/2005 | Ohki et al. .................... 399/406 |
| 7,004,464 | B2 * | 2/2006 | Hattori et al. ............ 271/258.03 |
| 7,212,320 | B2 | 5/2007 | Imoto |
| 7,380,787 | B2 * | 6/2008 | Fukumura .................... 271/264 |
| 7,561,311 | B2 * | 7/2009 | Toyoda et al. ................. 358/474 |
| 7,715,066 | B2 * | 5/2010 | Michiie .......................... 358/474 |
| 7,894,097 | B2 * | 2/2011 | Naruse ........................... 358/1.4 |
| 8,009,331 | B2 * | 8/2011 | Suzuki ........................... 358/296 |
| 2001/0026380 | A1 | 10/2001 | Imoto |
| 2006/0061836 | A1 | 3/2006 | Maruchi et al. |
| 2006/0077484 | A1 | 4/2006 | Toyoda et al. |

FOREIGN PATENT DOCUMENTS

| | | |
|---|---|---|
| JP | 4097876 B2 | 10/2001 |
| JP | 3832483 B2 | 4/2006 |
| JP | 2008-193685 | 8/2008 |

OTHER PUBLICATIONS

Abstract of JP 2006-115015 published Apr. 27, 2006.
International Search Report for PCT/JP2010/054617 filed Mar. 11, 2010.
Supplementary European Search Report issued Nov. 10, 2011 in corresponding European Application No. 10750954.9.
Chinese Office Action dated Aug. 5, 2013 issued in corresponding Chinese Application No. 201080011810.7.

* cited by examiner

IMAGE READ DEVICE AND COPIER

TECHNICAL FIELD

The present invention relates to a sheet-through type image read device and a copier.

BACKGROUND ART

Heretofore, an image read device that is called a sheet-through type is known which conveys an original in a sub-scanning direction and passes the conveyed original through a fixed read position, thereby performing sub-scanning on images of the original. A transparent member is arranged at the read position of an image read unit in order to pass light emitted by a light source inside the image read unit toward the original on the outside or light reflected by an image surface of the original and projected toward the inside of the image read unit. In this type of image read device, because the original passes in contact with the transparent member when the images of the original are read, it is inevitable that dust, or the like, sticking to the image-surface side of the original adheres to the transparent member. Furthermore, if an adhering material such as dust adheres to the read position of the transparent member, its effect appears on read image signals and the images are deteriorated. The material adhering to the transparent member causes image deterioration in an image read device of not only the sheet-through type but also other types. However, the effect appears on images as only a "point" in a type of image read device in which an original is fixed and an image read unit is moved in the sub-scanning direction to read the images, while it results in what is called a longitudinal line that extends in the sub-scanning direction and significant image deterioration is caused in a sheet-through type image read device.

Patent Document 1(Japanese Patent No: 3832483) describes an original read device that includes a moving unit to move a transparent member back and forth in an original conveying direction and a control unit that conveys the original and moves the transparent member by using the moving unit while causing the images to be read at a read position. Thus, because the transparent member is moved during the operation of reading the original, the reading of the images of the original is always performed at a different position of the transparent member; therefore, even if an adhering material such as dust or dirt is present on the transparent member, the decrease in image quality due to a longitudinal line can be prevented.

Furthermore, if an event causing the interruption of original conveyance occurs such as the occurrence of a jam of the original, the original read device described in Patent Document 1 stops the transparent member and, if an automatic document feeder (hereinafter, referred to as an ADF) that conveys the original to the read position is not opened with respect to a scanner, performs a control to return the transparent member to the home position. Thus, because the transparent member is in the home position upon reading of a subsequent original, it is possible to start reading the original in a smoother manner compared to the one that starts to read the original after returning the transparent member, which is not in the home position, to the home position.

However, in the above-described original read device, when an event causing the interruption of original conveyance occurs, the original being conveyed is stopped in an original conveying path. In the original read device described in Patent Document 1, the transparent member returns to the home position without any reference to the stop position of the original that is stopped in the above-described original conveying path. As a result, there is a possibility that the original will be damaged if the original is stopped in the state described below.

For example, in a device in which the home position is set on the most downstream side in the movable range of a transparent member as illustrated in FIG. 18A, if an original MS is stopped with the rear edge of the original located between the original conveying-direction downstream end of a transparent member 154 and a scoop guide member 156, damage to the original MS occurs as described below. Specifically, if the transparent member 154 is moved in the same direction as the original conveying direction in order to return the transparent member 154 to the home position, the rear edge of the original MS is in contact with the original conveying-direction downstream end of the transparent member 154 and the rear edge of the original MS is moved in the original conveying direction together with the transparent member 154. However, the leading edge of the original MS is sandwiched between discharge roller pair 92 and cannot be moved. Therefore, as illustrated in FIG. 18B, when the transparent member 154 returns to the home position, the part on the original conveying-direction upstream side from the discharge roller pair 92 is forcibly folded up in the conveying path and becomes crumpled, whereby the original is damaged.

Moreover, as illustrated in FIG. 19A, in a configuration where a flexible guide member 251 is arranged which is fixed to the downstream end of the transparent member 154 and is moved along a guide surface of the scoop guide member 156 together with the transparent member 154, the original is damaged if the original MS is stopped in a state where the rear edge of the original is placed on the guide surface of the scoop guide member 156. Specifically, if the transparent member 154 is moved in the same direction as the original conveying direction in order to return the transparent member 154 to the home position, the rear edge of the original MS is in contact with the original conveying-direction downstream end of the flexible guide member 251 and the rear edge of the original MS is moved in the original conveying direction along the guide surface of the scoop guide member 156 together with the flexible guide member 251. However, the leading edge of the original MS is sandwiched between the discharge roller pair 92 and cannot be moved. Therefore, as illustrated in FIG. 19B, when the transparent member 154 returns to the home position, the part of the original on the original conveying-direction upstream side from the discharge roller pair 92 is folded up in the conveying path and becomes crumpled, whereby the original is damaged.

Furthermore, in a device where the home position is set on the most upstream side in the movable range of the transparent member, as illustrated in FIG. 20A, if a jam of the original occurs because the leading edge of the original MS is in contact with an opposing guide member 97 and is bent over toward the transparent member to be in contact with the transparent member 154, damage to the original occurs. Specifically, when the transparent member 154 is moved in the direction opposite to the original conveying direction in order to return the transparent member 154 to the home position, the leading edge of the original MS is moved in the direction opposite to the original conveying direction together with the transparent member 154 and, as illustrated in FIG. 20B, the leading edge of the original is further bent over and jammed between a cover member 157, which contains a part of the transparent member 154, and the transparent member 154. Because the cover member 157 and the transparent member 154 are members on the side of the scanner, if an ADF 51 is opened with respect to a scanner 150, as illustrated in FIG. 20C, in a state where the leading edge of the original MS is jammed in the gap between the transparent member 154 and the cover member 157, the jammed part remains on the side of the scanner 150. On the other hand, because the vicinity of the rear edge of the original MS is sandwiched between the registration roller pair 89, the remaining part of the original MS is moved together with the ADF 51. As a result, the jammed part of the original MS is torn and the original is damaged.

Moreover, as illustrated in FIG. 21A, the original is damaged if the transparent member 154 returns to the home position on the most upstream side in the movable range of the transparent member in a state where the rear edge of the stopped original is located near the cover member 157 on the transparent member. Specifically, when the transparent member 154 is moved in the direction opposite to the original conveying direction in order to return the transparent member 154 to the home position, the original part on the transparent member 154 is moved in the direction opposite to the original conveying direction together with the transparent member 154 and, as illustrated in FIG. 21B, the rear edge of the original MS is jammed in the gap between the cover member 157 and the transparent member 154. Then, as illustrated in FIG. 21C, if the ADF 51 is opened with respect to the scanner 150, the jammed part remains on the scanner side. On the other hand, because the vicinity of the leading edge of the original MS is sandwiched between the discharge roller pair 92, the leading edge part of the original MS is moved together with the ADF 51. As a result, the jammed part of the original is torn and the original is damaged.

The present invention has been made in consideration of the above problems and it is an object of the present invention to provide an image read device and a copier that can perform image reading in a smooth manner after an event causing the interruption of original conveyance is resolved and prevent damage to the original.

DISCLOSURE OF INVENTION

According to one aspect of the present invention, there is provided an image read device that conveys an original while performing reading of an image of the original at a read position on a transparent member by a read unit fixed, the image read device including: a moving unit that moves the transparent member back and forth in an original conveying direction; a control unit that conveys the original and moves the transparent member by using the moving unit while causing the reading of the image to be performed at the read position; and a determining unit that, when an event causing interruption of original conveyance occurs, stops the transparent member and determines whether a control of returning the transparent member to a home position is to be performed or not in accordance with a stopped position of the original in an original conveying path.

Furthermore, according to another aspect of the present invention there is provided an image read device that conveys an original while performing reading of an image of the original at a read position on a transparent member by a read unit fixed, the image read device including: a moving unit that moves the transparent member back and forth in an original conveying direction; a control unit that conveys the original and moves the transparent member by using the moving unit while causing the reading of the image to be performed at the read position; and a determining unit that determines whether a control of returning the transparent member to a home position is to be performed or movement of the transparent member is to be stopped in accordance with a moving direction of the transparent member when an event causing interruption of original conveyance occurs if a home position of the transparent member is at a most upstream position in the original conveying direction in a movable range of the transparent member.

BEST MODE(S) FOR CARRYING OUT THE INVENTION

An explanation will be given of an embodiment in which the present invention is applied to an electrophotographic-system copier (hereinafter, simply referred to as a copier) below.

Figure 1:
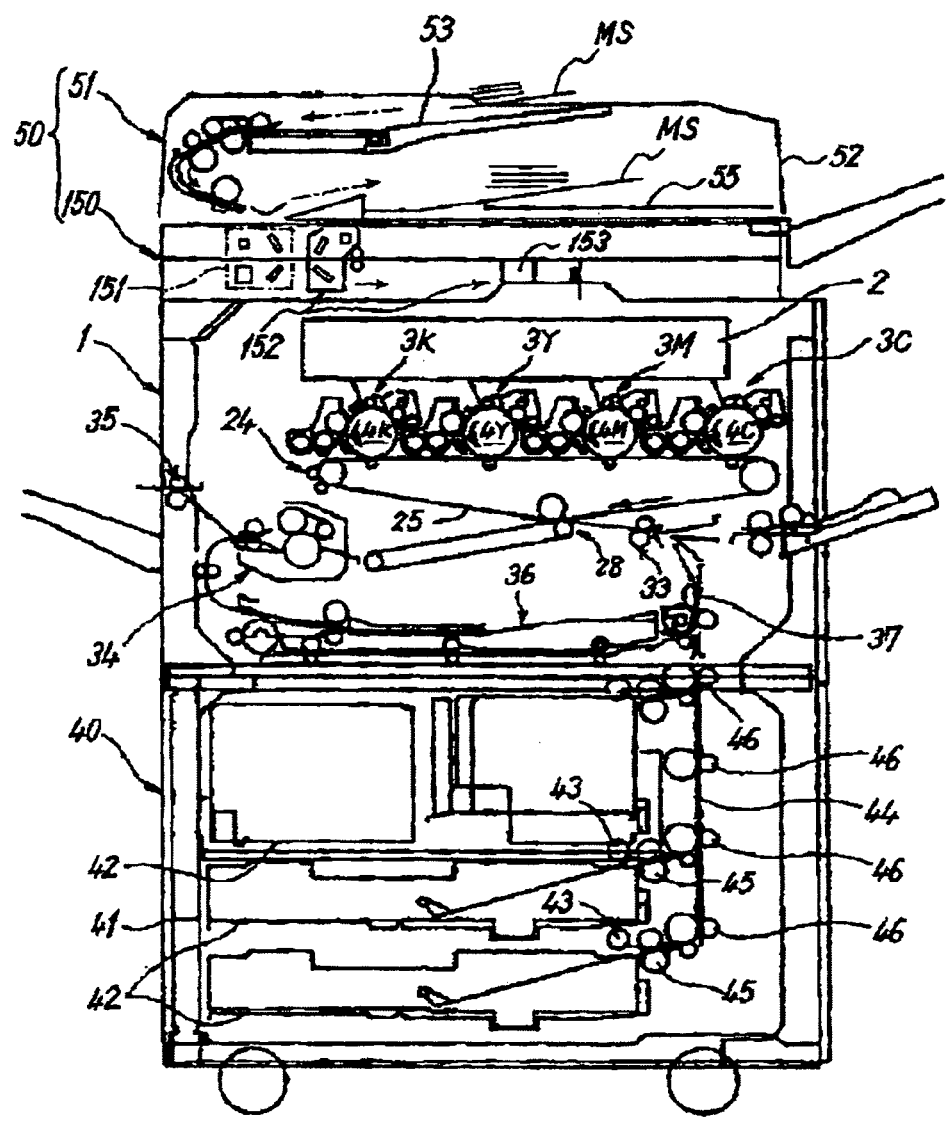
FIG. 1 is an explanatory diagram that illustrates the schematic configuration of a copier according to this embodiment.

First, an explanation will be given of the basic configuration of a copier according to the present embodiment. FIG. 1 is an explanatory diagram that illustrates the schematic configuration of the copier according to the embodiment. The copier includes an image forming unit 1 that is an image forming means, a blank-sheet feed device 40, and an original read device 50. The original read device 50 includes the scanner 150 that is an original read unit fixed on the image forming unit 1 and the ADF 51 that is an original conveying unit supported by this.

The blank-sheet feed device 40 includes two feed cassettes 42 arranged at multiple stages in a paper bank 41, sending rollers 43 that send a transfer sheet from the feed cassettes 42, separation rollers 45 that separate the sent transfer sheet and feed it to a feed path 44, and the like. Furthermore, it also includes a plurality of conveying rollers 46, and the like, that convey the transfer sheet to a feed path 37 in the image forming unit 1. The transfer sheet in the feed cassette is then fed to the feed path 37 in the image forming unit 1.

Figure 2:
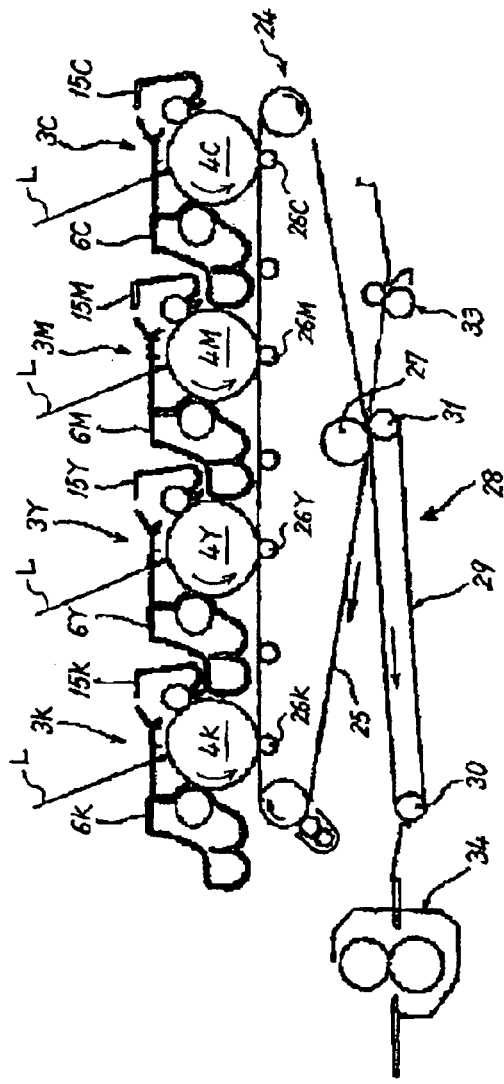
FIG. 2 is an explanatory diagram that illustrates a part of the internal configuration of an image forming unit in FIG. 1 in an enlarged manner.

FIG. 2 is an explanatory diagram that illustrates a part of the internal configuration of the image forming unit 1 in FIG. 1 in an enlarged manner. The image forming unit 1 as an image forming means includes an optical writing device 2, four process units 3K, 3Y, 3M, and 3C that form toner images in colors of K, Y, M, and C, a transfer unit 24, a sheet conveying unit 28, a registration roller pair 33, a fixing device 34, a switchback device 36, the feed path 37, and the like. An undepicted light source, such as a laser diode or an LED arranged in the optical writing device 2 is driven so that a laser light L is emitted toward the four drum-shaped photosensitive members 4K, 4Y, 4M, and 4C. This emission causes electrostatic latent images to be formed on the surfaces of the photosensitive members 4K, 4Y, 4M, and 4C, and the latent images are developed into toner images through a predetermined developing process. The accompanied characters such as K, Y, M, and C attached after the reference numerals indicate that they have specifications for black, yellow, magenta, and cyan, respectively.

Each of the process units 3K, 3Y, 3M, and 3C has a photosensitive member and various devices arranged around it that are supported by a common support member as a single unit and is removable from the main body of the image forming unit 1. Taking the process unit 3K for black as an example, it includes, in addition to the photosensitive member 4K, a developing device 6K to develop the electrostatic latent image formed on its surface into a black toner image. Moreover, it also includes a drum cleaning device 15K that performs cleaning for transfer residual toner that adheres to the surface of the photosensitive member 4K after it passes through a primary transfer nip for black described later, and the like. The copier has what is called a tandem-type configuration in which the four process units 3K, 3Y, 3M, and 3C are arranged side-by-side such that they are opposed to an intermediate transfer belt 25 described later along its endless movement direction.

Figure 3:
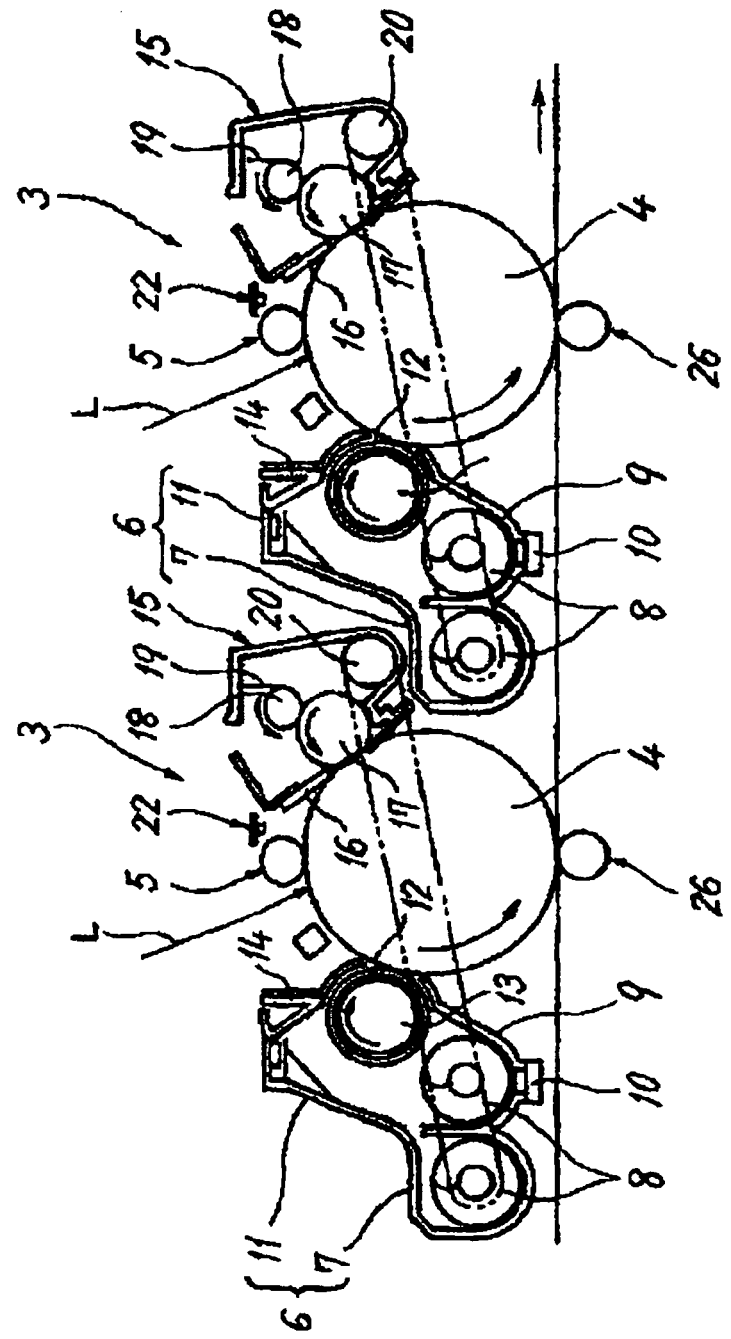
FIG. 3 is an explanatory diagram that illustrates a part of a tandem section constituted by four process units in the image forming unit in FIG. 2 in an enlarged manner.

FIG. 3 is an explanatory diagram that illustrates a part of a tandem section constituted by the four process units 3K, 3Y, 3M, and 3C in the image forming unit 1 in FIG. 2 in an enlarged manner. Because the four process units 3K, 3Y, 3M, and 3C have almost the same configuration except that the colors of toner used are different, the accompanied characters such as K, Y, M, and C attached to each of the reference numerals are omitted in the same figure. As illustrated in the same figure, a process unit 3 includes a charge device 5, a developing device 6, a drum cleaning device 15, a neutralizing lamp 22, and the like, around a photosensitive member 4.

A drum-shaped one that is obtained by forming a photosensitive layer on a normal tube of aluminum, or the like, by applying an organic photosensitive material that has photosensitivity, is used as the photosensitive member 4. An endless-belt shaped one may be used.

The developing device 6 develops the latent image by using a two-component developer that contains an undepicted magnetic carrier and nonmagnetic toner. It includes a stirring unit 7 that stirs the two-component developer contained inside while conveying it to feed it to a developing sleeve 12, and a developing unit 11 to transfer the toner in the two-component developer carried by the developing sleeve 12 into the photosensitive member 4.

The stirring unit 7 includes two conveying screws 8 that are arranged at a position lower than the developing unit 11 and arranged in parallel to each other, a partition plate arranged between the screws, a toner concentration sensor 10 arranged on the bottom of a developing case 9, and the like.

The developing unit 11 includes the developing sleeve 12 that is opposed to the photosensitive member 4 through an opening of the developing case 9, a magnet roller 13 that is arranged inside it such that it cannot be rotated, a doctor blade 14 whose end is located close to the developing sleeve 12, and the like. The developing sleeve 12 is nonmagnetic and has the shape of a tube such that it can be rotated. The magnet roller 13 has a plurality of magnetic poles that is sequentially arranged in the rotation direction of the developing sleeve 12 from the position opposed to the doctor blade 14. Each of the magnetic poles causes a magnetic force to affect the two-component developer on the developing sleeve 12 at a predetermined position in the rotation direction. Thus, the two-component developer sent from the stirring unit 7 is attracted to and carried by the surface of the developing sleeve 12, and a magnetic brush is formed along a magnetic line on the surface of the developing sleeve 12.

The magnetic brush is conveyed to a developing area that is opposed to the photosensitive member 4 after the toner layer thickness is adjusted to an appropriate layer thickness when it passes through the position opposed to the doctor blade 14 in accordance with the rotation of the developing sleeve 12. Then, the toner is transferred onto the electrostatic latent image due to the potential difference between the developing bias applied to the developing sleeve 12 and the electrostatic latent image on the photosensitive member 4, thereby contributing to the development. Furthermore, it returns to the inside of the developing unit 11 again in accordance with the rotation of the developing sleeve 12 and, after it is removed from the surface of the developing sleeve 12 due to the influence of a repulsive magnetic field formed between the magnetic poles of the magnet roller 13, it returns to the inside of the stirring unit 7. An appropriate amount of toner is supplied to the two-component developer in the stirring unit 7 in accordance with a detection result by the toner concentration sensor 10. Instead of the one that uses the two-component developer, the one that uses a one-component developer that does not contain magnetic carrier may be used as the developing device 6.

Although the one with a method of pressing a cleaning blade 16 made of polyurethane rubber against the photosensitive member 4 is used as the drum cleaning device 15, the one with other methods may be used. In order to improve the cleaning performance, the present example uses the one with a method in which a contact conductive fur brush 17 whose outer surface is in contact with the photosensitive member 4 is rotatable in the direction indicated by the arrow in the figure. The fur brush 17 also has the function of scraping off any lubricant agent from an undepicted solid lubricant agent and reducing the lubricant agent to a fine powder while applying it to the surface of the photosensitive member 4. A metallic magnetic-field roller 18 that applies bias to the fur brush 17 is rotatably mounted in the direction indicated by the arrow in the figure, and the edge of a scraper 19 is pressed against it. The toner that adheres to the fur brush 17 is transferred onto the magnetic-field roller 18 that is rotated in a counter direction with respect to the fur brush 17 with which it is in contact while the bias is applied. Then, after it is scraped off the magnetic-field roller 18 by the scraper 19, it drops down onto a collecting screw 20. The collecting screw 20 conveys the collected toner toward the end of the drum cleaning device 15 in the direction perpendicular to the sheet surface of the figure and delivers it to a recycle conveying device on the outside. The recycle conveying device sends the delivered toner to the developing device 6 for recycling.

The neutralizing lamp 22 neutralizes the photosensitive member 4 by light irradiation. The neutralized surface of the photosensitive member 4 is subjected to an optical writing process by the optical writing device 2 after it is uniformly charged by a charge device 5. The one that rotates the charge roller to which the charge bias is applied in contact with the photosensitive member 4 is used as the charge device 5. A scorotron charger, or the like, that performs a charge process without being in contact with the photosensitive member 4 may be used.

In previously illustrated FIG. 2, the K, Y, M, and C toner images are formed on the photosensitive members 4K, 4Y, 4M, and 4C of the four process units 3K, 3Y, 3M, and 3C by the process described above.

The transfer unit 24 is arranged under the four process units 3K, 3Y, 3M, and 3C. The transfer unit 24 endlessly moves the intermediate transfer belt 25 that is supported by a plurality of rollers in contact with the photosensitive members 4K, 4Y, 4M, and 4C in a clockwise direction in the figure. Thus, the primary transfer nips for K, Y, M, and C are formed where the photosensitive members 4K, 4Y, 4M, and 4C are in contact with the intermediate transfer belt 25. The intermediate transfer belt 25 is pressed against the photosensitive members 4K, 4Y, 4M, and 4C by primary transfer rollers 26K, 26Y, 26M, and 26C, arranged inside the belt loop near the primary transfer nips for K, Y, M, and C. A primary transfer bias is applied to each of the primary transfer rollers 26K, 26Y, 26M, and 26C by an undepicted power source. Thus, primary-transfer electric fields that electrostatically move the toner images on the photosensitive members 4K, 4Y, 4M, and 4C toward the intermediate transfer belt 25 are formed in the primary transfer nips for K, Y, M, and C. The toner images are sequentially primary-transferred in a superimposed manner in each of the primary transfer nips onto the surface of the intermediate transfer belt 25 that sequentially passes through the primary transfer nips for K, Y, M, and C in accordance with the endless movement in the clockwise direction in the figure. Because of the primary transfer in a superimposed manner, the four-color superimposed toner images (hereinafter, referred to as a four-color toner image) are formed on the surface of the intermediate transfer belt 25.

The sheet conveying unit 28 that endlessly moves an endless sheet conveying belt 29 placed between a drive roller 30 and a secondary transfer roller 31 is arranged under the transfer unit 24 in the figure. The intermediate transfer belt 25 and the sheet conveying belt 29 are sandwiched between the secondary transfer roller 31 of its own and a lower-part support roller 27 of the transfer unit 24. Thus, a secondary transfer nip is formed where the surface of the intermediate transfer belt 25 is in contact with the surface of the sheet conveying belt 29. A secondary transfer bias is applied to the secondary transfer roller 31 by an undepicted power source. On the other hand, the lower-part support roller 27 of the transfer unit 24 is connected to ground. Thus, a secondary-transfer electric field is formed in the secondary transfer nip.

The registration roller pair 33 is arranged on the right side of the secondary transfer nip in the figure and sends the transfer sheet sandwiched between the rollers to the secondary transfer nip in a timing to be synchronized with the four-color toner image on the intermediate transfer belt 25. The four-color toner image on the intermediate transfer belt 25 is collectively secondary-transferred onto the transfer sheet in the secondary transfer nip due to the influence of the secondary-transfer electric field and nip pressure, whereby a full-color image is produced in combination with the white color of the transfer sheet. The transfer sheet, which has passed through the secondary transfer nip, is separated from the intermediate transfer belt 25 and, while being held by the surface of the sheet conveying belt 29, is conveyed to the fixing device 34 in accordance with its endless movement.

The transfer residual toner, which has not transferred onto the transfer sheet in the secondary transfer nip, adheres to the surface of the intermediate transfer belt 25, which has passed through the secondary transfer nip. The transfer residual toner is scraped off and removed by the belt cleaning device that is in contact with the intermediate transfer belt 25.

After the full-color image is fixed to the transfer sheet conveyed to the fixing device 34 due to the pressure and the heat in the fixing device 34, the transfer sheet is sent from the fixing device 34 to a discharge roller pair 35 and then discharged to the outside of the apparatus.

In previously illustrated FIG. 1, the switchback device 36 is arranged under the sheet conveying unit 28 and the fixing device 34. Thus, the path of the transfer sheet on which the image fixing process has been finished for one side is switched by a switching claw to the side of a transfer-sheet turnover device, whereby the transfer sheet is turned over and moved to the secondary transfer nip again. Then, after the secondary transfer process and the fixing process of images are performed on the other side, the transfer sheet is discharged into a discharge tray.

The scanner 150 fixed to the top of the image forming unit 1 includes a fixed read unit and a movable read unit 152. The movable read unit 152 is arranged just under an undepicted second contact glass fixed to the upper wall of a casing of the scanner 150 such that it is in contact with an original MS and can move an optical system constituted by a light source, a reflection mirror, and the like, in the horizontal direction in the figure. In the process of moving the optical system from the left side to the right side in the figure, the light emitted by the light source is reflected by an undepicted original placed on the second contact glass and then the light is received by an image read sensor 153 fixed to a scanner main body through a plurality of reflection mirrors.

On the other hand, the fixed read unit includes a first-surface fixed read unit 151 arranged inside the scanner 150 and an undepicted second-surface fixed read unit arranged in the ADF 51. The first-surface fixed read unit 151 that includes a light source, a reflection mirror, an image read sensor such as a CCD, or the like, is arranged just under an undepicted first contact glass fixed to the upper wall of the casing of the scanner 150 such that it is in contact with the original MS.

When the original MS conveyed by the ADF 51 described later passes over the first contact glass, the light emitted by the light source is sequentially reflected by the surface of the original while the light is received by the image read sensor through a plurality of reflection mirrors. Thus, the first surface of the original MS is scanned without moving the optical system configured by the light source, the reflection mirror, and the like. Furthermore, the second-surface fixed read unit scans the second surface of the original MS after the original MS has passed through the first-surface fixed read unit 151.

Figure 4:
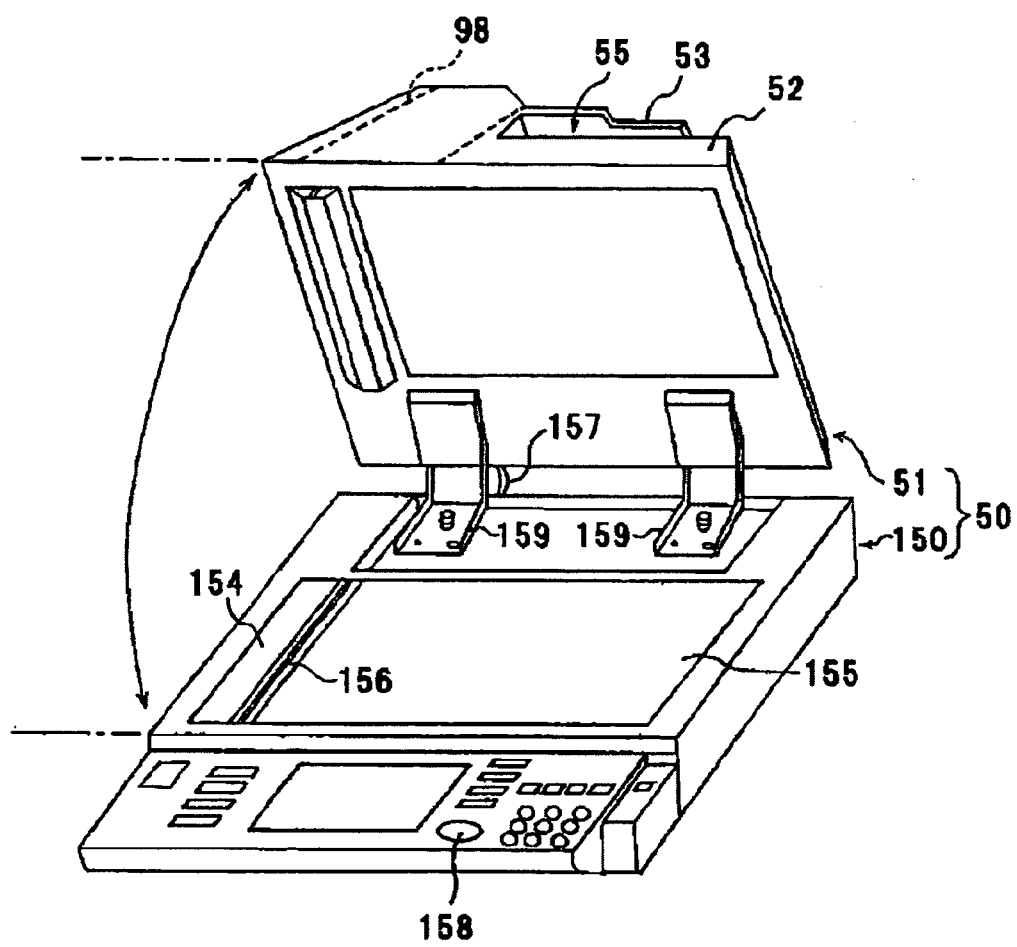
FIG. 4 is a perspective view that illustrates the configuration of a scanner and an ADF in the copier in FIG. 1.

In the ADF 51 arranged on the scanner 150, an original placement board 53 for placing the original MS before it is read, a conveying unit 98 for conveying the original MS, an original stack board 55 for stacking the original MS after it is read, and the like are held by a main-body cover 52. As illustrated in FIG. 4, it is supported by a hinge 159 fixed to the scanner 150 such that it can swing in a vertical direction. It moves like an openable/closable door because of the swing, and a first contact glass 154 (transparent member) and a second contact glass 155 on the top side of the scanner 150 are exposed in the state where it is opened. In the case of a one-side bound original, such as a book in which one edge of a pile of originals is bound, because the originals cannot be separated one by one, the conveyance by the ADF cannot be performed. Therefore, in the case of the one-side bound original, after the ADF 51 is opened as illustrated in FIG. 4, the one-side bound original is placed downward on the second contact glass 155 with the page to be read opened, and then the ADF is closed. Then, the images of the page are read by the movable read unit 152 of the scanner 150 illustrated in FIG. 1.

On the other hand, in the case of a pile of originals obtained by simply stacking a plurality of separate originals MS, it is possible that the originals MS are automatically conveyed by the ADF 51 one by one while being sequentially read by the first-surface fixed read unit 151 in the scanner 150 or the second-surface fixed read unit in the ADF 51. In this case, after the pile of originals is placed on the original placement board 53, a copy start button 158 (copy start key, start key) is pressed. Then, the ADF 51 sequentially conveys the original MS to a conveying unit from the top of the pile of originals placed on the original placement board 53 and conveys the original MS toward the original stack board 55 while turning it over. In the process of the conveyance, the original MS passes just under the first-surface fixed read unit 151 of the scanner 150 just after the original MS is turned over. At that time, the images on the first surface of the original MS are read by the first-surface fixed read unit 151 of the scanner 150.

Figure 5:
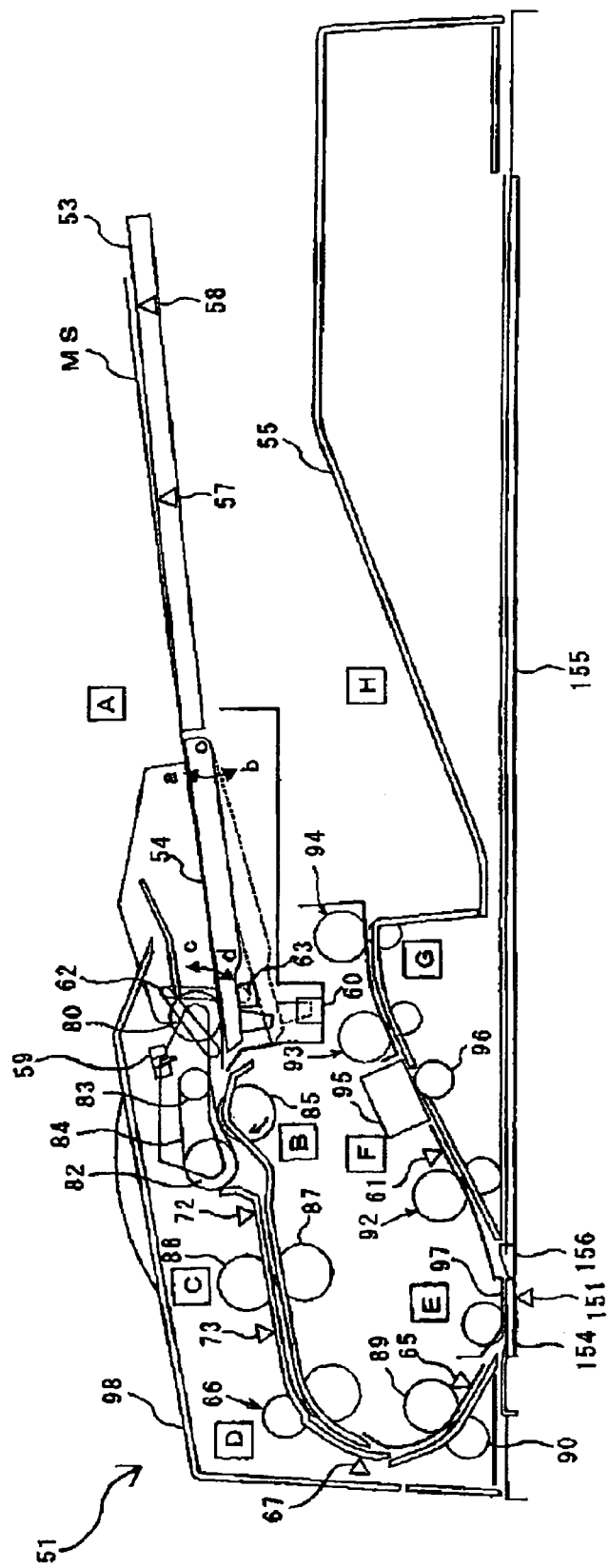
FIG. 5 is an explanatory diagram that illustrates the configuration of the main section of the ADF as well as the upper section of the scanner in an enlarged manner.
Figure 6:
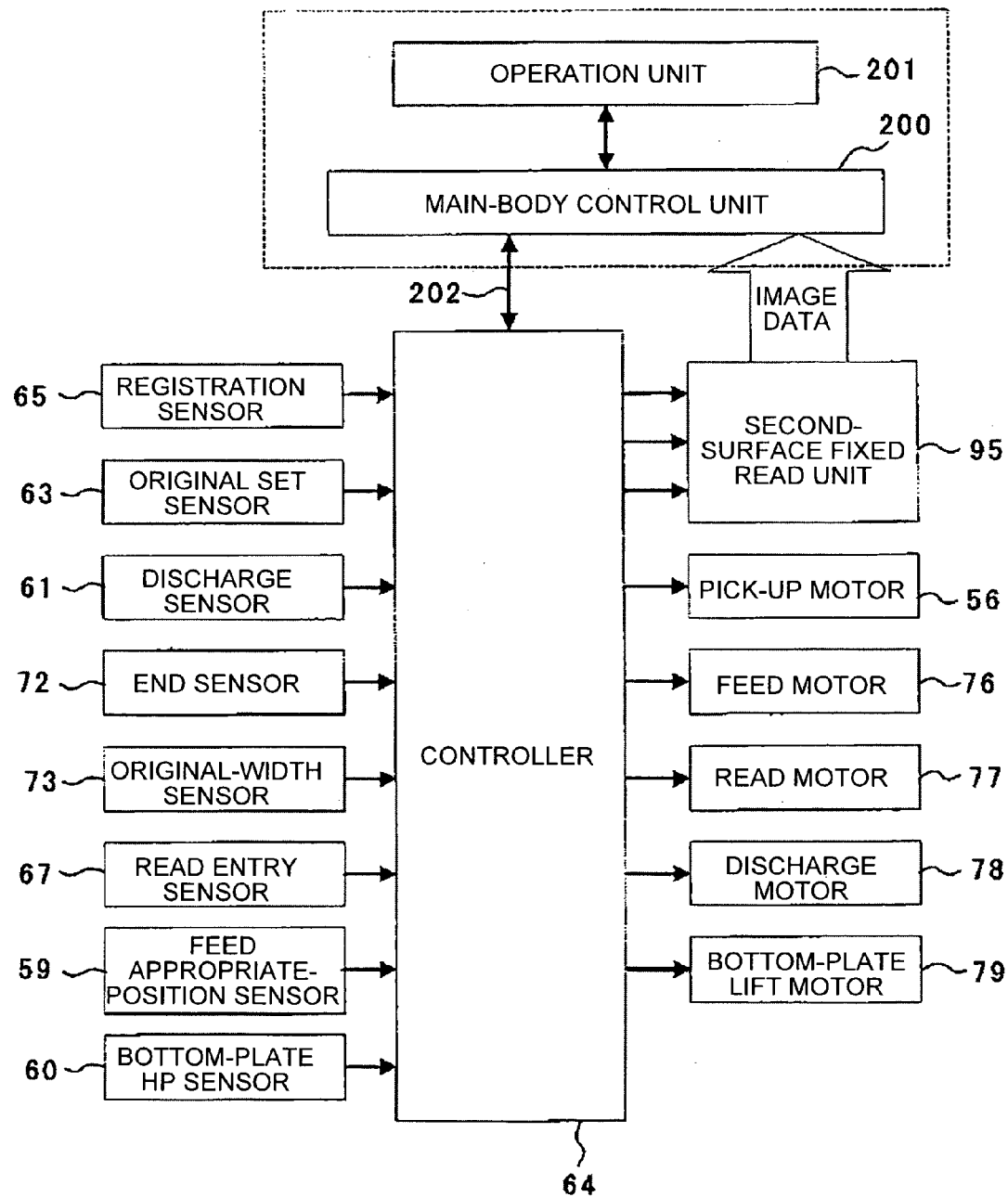
FIG. 6 is a block diagram that illustrates a part of an electric circuit of the copier.

FIG. 5 is an enlarged configuration diagram that illustrates the configuration of the main section of the ADF 51 as well as the upper section of the scanner 150. Furthermore, FIG. 6 is a block diagram that illustrates a part of an electric circuit of the ADF 51 and the scanner 150. The ADF 51 includes an original set section A, a separation feed section B, a registration section C, a turn section D, a first read conveying section E, a second read conveying section F, a discharge section G, a stack section H, and the like.

As illustrated in FIG. 6, the ADF 51 includes a controller 64 configured by an Application Specific Integrated Circuit (ASIC), or the like, whereby it can control various devices and sensors. A registration sensor 65, an original set sensor 63, a discharge sensor 61, an end sensor 72, an original-width sensor 73, a read entry sensor 67, a feed appropriate-position sensor 59, a bottom-plate HP sensor 60, and the like are connected to the controller 64. Furthermore, a second-surface fixed read unit 95, a pick-up motor 56, a feed motor 76, a read motor 77, a discharge motor 78, a bottom-plate lift motor 79, and the like are also connected. Moreover, a main-body control unit 200 that performs control on each device of the scanner 150, an operation unit 201, and the like are also connected. The scanner 150 includes the main-body control unit 200 constituted by an undepicted Central Processing Unit (CPU), a Random Access Memory (RAM), and the like, whereby it can control various undepicted devices and sensors inside the scanner 150. Moreover, it is connected to the controller 64 of the ADF (51) via an I/F 202 so that it can indirectly control various devices and sensors inside the ADF 51 via the controller 64.

In FIG. 5, the original set section A includes the original placement board 53 on which a pile of originals MS is set, and the like. Furthermore, the separation feed section B separates and feeds the original MS one by one from the pile of the set originals MS. Moreover, the registration section C temporarily hits the fed original MS to align the original MS and then feeds it. Furthermore, the turn section D includes a curved conveying section that is curved like a C shape and turns over the original MS while turning back the original MS in the curved conveying section. Moreover, the first read conveying section E conveys the original MS on the first contact glass 154 while causing the first-surface fixed read unit 151 arranged inside an undepicted scanner to read the first surface of the original MS under the first contact glass 154. Furthermore, the second read conveying section F conveys the original MS under the second-surface fixed read unit 95 while causing the second-surface fixed read unit 95 to read the second surface of the original MS. Furthermore, the discharge section G discharges the original MS, for which the images on both surfaces have been read, toward the stack section H. Moreover, the stack section H stacks the original MS on the original stack board 55.

The original MS is set in a state where the leading edge of the original is placed on a movable original table 54 that can swing in the directions indicated by arrows a and b in the figure depending on the thickness of the pile of the originals MS and the rear end side of the original is placed on the original placement board 53. At that time, on the original placement board 53, undepicted side guides hit against both edges in its width direction (the direction perpendicular to the sheet surface of the figure) so that the position in the width direction is adjusted. The original MS set in this manner pushes up a lever member 62 swingably arranged above the movable original table 54. Then, in accordance with it, the original set sensor 63 detects the set of the original MS and sends a detection signal to the controller 64. Then, the detection signal is sent to the main-body control unit 200 from the controller 64 via the I/F 202.

A first length sensor 57 and a second length sensor 58 constituted by a reflection-type photosensor or an actuator-type sensor that detects the length of the original MS in a conveying direction is held by the original placement board 53. These length sensors detect the length of the original MS in a conveying direction.

A pick-up roller 80 that is movably supported by a cam mechanism in a vertical direction (the directions indicated by arrows c and d in the figure) is arranged above the pile of the originals MS placed on the movable original table 54. The cam mechanism is driven by the pick-up motor 56 so that the pick-up roller 80 can move vertically. If the pick-up roller 80 is moved up, the movable original table 54 swings in the direction indicated by the arrow a in the figure in accordance with it and the pick-up roller 80 is brought into contact with the original MS on the top of the pile of the originals MS. Furthermore, if the movable original table 54 is moved up, the moving up of the movable original table 54 up to the upper limit is detected by the feed appropriate-position sensor 59. Thus, the pick-up motor 56 is stopped and the moving up of the movable original table 54 is stopped.

A key operation for specifying settings for a read mode that indicates a double-sided read mode or a one-sided read mode, a press operation of a copy start key, or the like is performed by an operator with respect to the operation unit 201 constituted by a numerical keypad, a display, or the like arranged on the main body of the copier. If the copy start key is pressed, an original feed signal is sent from the main-body control unit 200 to the controller 64 of the ADF 51 via the I/F 202. Then, the pick-up roller 80 is rotated and driven due to the normal rotation of the feed motor 76 so that the original MS on the movable original table 54 is fed from the movable original table 54.

Upon setting to the double-sided read mode or the one-sided read mode, it is possible to collectively specify the double-sided or one-sided setting with respect to all of the originals MS placed on the movable original table 54. Furthermore, it is also possible to individually specify the setting for the read mode with respect to the individual original MS such that the double-sided read mode is set for the first and the tenth originals MS while the one-sided read mode is set for the other originals MS.

The original MS fed by the pick-up roller 80 enters the separation feed section B and is fed to a contact position with a feed belt 84. The feed belt 84 is supported by a drive roller 82 and a driven roller 83 and is endlessly moved in the clockwise direction in the figure due to the rotation of the drive roller 82 in accordance with the normal rotation of the feed motor 76. The lower support surface of the feed belt 84 is in contact with a reverse roller 85 that is rotated and driven in the clockwise direction in the figure due to the normal rotation of the feed motor 76. At the contact area, the surface of the feed belt 84 is moved in a feed direction. On the other hand, the reverse roller 85 is in contact with the feed belt 84 with a predetermined pressure and, when it is in direct contact with the feed belt 84 or when only one original MS is sandwiched at the contact area, it is rotated together with the feed belt 84 or the original MS. However, when a plurality of originals MS are sandwiched at the contact area, the force of rotation together with it is smaller than the torque of a torque limiter; therefore, it is rotated and driven in the clockwise direction in the figure opposite to the direction of rotation together with it. Thus, the moving force in the direction opposite to the feeding is applied to the original MS lower than the topmost original MS by the reverse roller 85 and only the topmost original MS is separated from several originals.

The original MS separated one by one because of the operation of the feed belt 84 and the reverse roller 85 enters the registration section C. Then, when it passes just under the end sensor 72, its leading end is detected. At that time, although the pick-up roller 80, which receives the drive force of the pick-up motor 56, is still rotated and driven, because it is separated from the original MS due to the moving down of the movable original table 54, the original MS is conveyed due to only the endless moving force of the feed belt 84. Then, the endless movement of the feed belt 84 is continued for a predetermined time from the timing in which the leading edge of the original MS is detected by the end sensor 72, and the leading edge of the original MS hits against a contact area between a pull-out drive roller 86 and a pull-out driven roller 87 that is rotated and driven in contact with it. The rear-edge side of the original MS is fed in a feed direction in a state where the leading edge of the original MS hits against the contact area between both rollers so that the leading edge is positioned at the contact area while the original MS is in a state of being bent for a predetermined amount. Thus, the skew (tilt) of the original MS is corrected and the original MS is positioned along a feed direction.

The pull-out driven roller 87 has a function of conveying the original MS, for'which the skew has been corrected, to an intermediate roller pair 66 on the downstream side in an original conveying direction as well as the function of correcting the skew of the original MS, and is rotated and driven due to the inverse rotation of the feed motor 76. If the feed motor 76 is inversely rotated, the pull-out driven roller 87 and one of the rollers of the intermediate roller pair 66 that are in contact with each other start to be rotated and the endless movement of the feed belt 84 is stopped. Furthermore, at that time, the rotation of the pick-up roller 80 is also stopped.

The original MS fed by the pull-out driven roller 87 passes just under the original-width sensor 73. The original-width sensor 73 includes a plurality of sheet detecting units constituted by a reflection-type photosensor, or the like, and the sheet detecting units are arranged in an original width direction (the direction perpendicular to the sheet surface of the figure). The size of the original MS in a width direction is detected on the basis of which one of the sheet detecting units detects the original MS. Furthermore, the length of the original MS in a conveying direction is detected in accordance with a timing from when the leading edge of the original MS is detected by the end sensor 72 to when the rear edge of the original MS is not detected by the end sensor 72.

The leading edge of the original MS whose size in the width direction is detected by the original-width sensor 73 enters the turn section D and is sandwiched at the contact area between the rollers of the intermediate roller pair 66. The conveying speed of the original MS by the intermediate roller pair 66 is set to be higher than the conveying speed of the original MS in the first read conveying section E described later. Thus, the time for sending the original MS to the first read conveying section E is reduced.

The leading edge of the original MS conveyed in the turn section D passes through the position opposed to the read entry sensor 67. Thus, if the leading edge of the original MS is detected by the read entry sensor 67, the original conveying speed by the intermediate roller pair 66 is reduced before the leading edge is conveyed to the position of a read entry roller pair (a pair of 89 and 90) on the downstream side in a conveying direction. Furthermore, in accordance with the start of the rotation and drive of the read motor 77, one roller of the read entry roller pair (89, 90), one roller of a read exit roller pair 92, and one roller of a second read exit roller pair 92 start to be rotated and driven, respectively.

In the turn section D, the up and down sides of the original MS are reversed while the original MS is conveyed in the curved conveying path between the intermediate roller pair 66 and the read entry roller pair (89, 90), and the conveying direction is turned. Then, the leading edge of the original MS, which has passed through the nip between the rollers of the read entry roller pair (89, 90), passes just under the registration sensor 65. At that time, if the leading edge of the original MS is detected by the registration sensor 65, the original conveying speed is reduced for a predetermined conveyance distance, and the conveyance of the original MS is temporarily stopped before the first read conveying section E. Furthermore, a registration stop signal is sent to the main-body control unit 200 via the I/F 202.

If the main-body control unit 200, which has received the registration stop signal, sends a read start signal, the rotation of the read motor 77 is restarted and the conveying speed of the original MS is increased to a predetermined conveying speed until the leading edge of the original MS reaches the first read conveying section E under the control of the controller 64. Then, a gate signal that indicates an effective image area of the first surface of the original MS in the sub-scanning direction is sent from the controller 64 to the main-body control unit 200 at a timing in which the leading edge of the original MS computed by using a pulse count of the read motor 77 reaches the read position of the first-surface fixed read unit 151. This sending is continued until the rear edge of the original MS passes through the read position of the first-surface fixed read unit 151, and the first surface of the original MS is read by the first-surface fixed read unit 151.

After the original MS, which has passed through the first read conveying section E, passes through the read exit roller pair 92 described later, the leading edge is detected by the discharge sensor 61. If the one-sided read mode is set, it is not necessary to read the second surface of the original MS by using the second-surface fixed read unit 95 described later. Therefore, if the leading edge of the original MS is detected by the discharge sensor 61, the normal-rotation drive of the discharge motor 78 is started and the discharge rollers of discharge roller pairs 93, 94 at the lower side in the figure are rotated and driven in the clockwise direction in the figure. Moreover, a timing in which the rear edge of the original MS passes through the nip of the discharge roller pair 94 is computed in accordance with the pulse count of the discharge motor after the leading edge of the original MS is detected by the discharge sensor 61. Then, in accordance with the computed result, in a timing just before the rear edge of the original MS passes through the nip of the discharge roller pair 94, the drive speed of the discharge motor 78 is reduced and the original MS is discharged at a speed such that the original MS does not jump out of the original stack board 55.

On the other hand, if the double-sided read mode is set, after the leading edge of the original MS is detected by the discharge sensor 61, the timing before it reaches the second-surface fixed read unit 95 is computed in accordance with the pulse count of the read motor 77. Then, a gate signal that indicates an effective image area of the second surface of the original MS in sub-scanning direction is sent from the controller 64 to the main-body control unit 200 at that timing. This sending is continued until the rear edge of the original MS passes through the read position by the second-surface fixed read unit 95 so that the second surface of the original MS is read by the second-surface fixed read unit 95.

The second-surface fixed read unit 95 as a read unit is constituted by a contact image sensor (CIS), and coating processing has been performed on its read surface in order to prevent a read longitudinal line caused because a paste-like foreign matter adhering to the original MS adheres to the read surface. A second read roller 96 is arranged at a position opposed to the second-surface fixed read unit 95 as an original support unit that supports the original MS from the non read surface side (the first surface side). The second read roller 96 has functions of preventing the floating of the original MS at the read position by the second-surface fixed read unit 95 as well as operating as a reference white section to acquire shading data in the second-surface fixed read unit 95. In the copier, although the second read roller 96 is used as the original support unit that supports the original at the position opposed to the second-surface fixed read unit 95, a guide-plate shaped one may be used.

Figure 7:
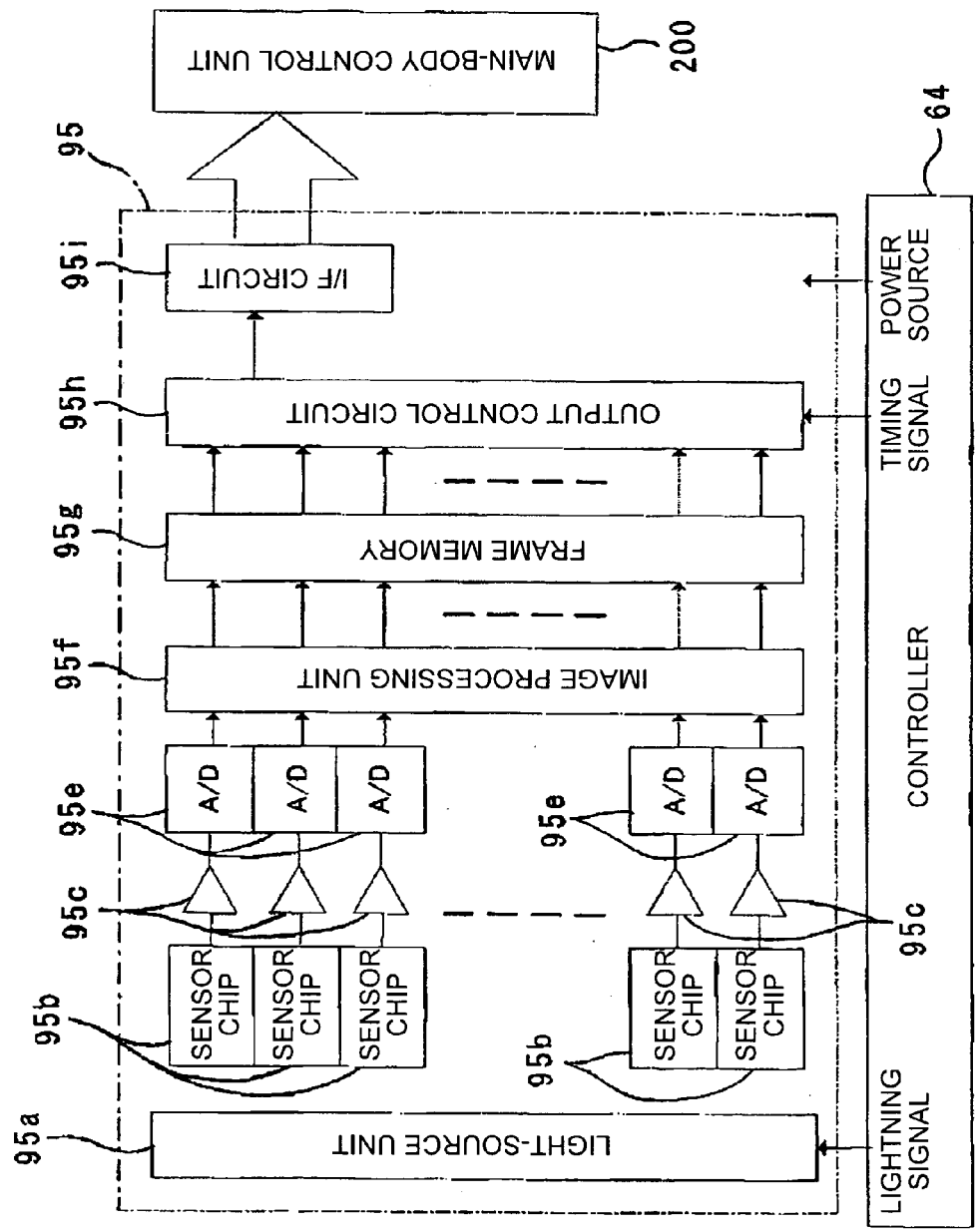
FIG. 7 is a block diagram that illustrates the main section of an electric circuit of a second-surface fixed read unit in FIG. 6.

FIG. 7 is a block diagram that illustrates the main section of an electric circuit of the second-surface fixed read unit 95. As illustrated in the same figure, the second-surface fixed read unit 95 includes a light-source unit 95a constituted by an LED array, a fluorescent light, a cold-cathode tube, or the like. Furthermore, it also includes a plurality of sensor chips 95b that are arranged in the main scanning direction (the direction that corresponds to the original width direction), a plurality of OP amplifier circuits 95c that are individually connected to the respective sensor chips 95b, and a plurality of A/D converters 95e that are individually connected to the respective OP amplifier circuits 95c. Moreover, it also includes an image processing unit 95f, a frame memory 95g, an output control circuit 95h, an I/F circuit 95i, and the like.

The sensor chip 95b includes a photoelectric conversion element referred to as an equal-magnification contact image sensor and a collecting lens. Before an undepicted original enters the read position by the second-surface fixed read unit 95, a lightning ON signal is sent from the controller 64 to the light-source unit 95a. Thus, the light-source unit 95a is lighted up and light is emitted toward the second surface of the undepicted original. In the plurality of sensor chips 95b, the reflected light reflected by the second surface of the original is focused onto the photoelectric conversion element by the collecting lens and read as image information. The image information read by each of the sensor chips 95b is amplified by the OP amplifier circuit 95c and then converted into digital image information by the A/D converter 95e. After the digital image information is input to the image processing unit 95f and is subjected to the shading correction, or the like, it is temporarily stored in the frame memory 95g. Afterwards, after it is converted by the output control circuit 95h into a data format receivable by the main-body control unit 200, it is output to the main-body control unit 200 via the I/F circuit 95i. A timing signal for notifying the timing (image data after the timing is treated as effective data) in which the leading edge of the original reaches the read position by the second-surface fixed read unit 95, a lightning signal of a light source, a power source, or the like are output from the controller 64.

Next, an explanation will be given of the characteristic configuration of the copier.

Figure 8:
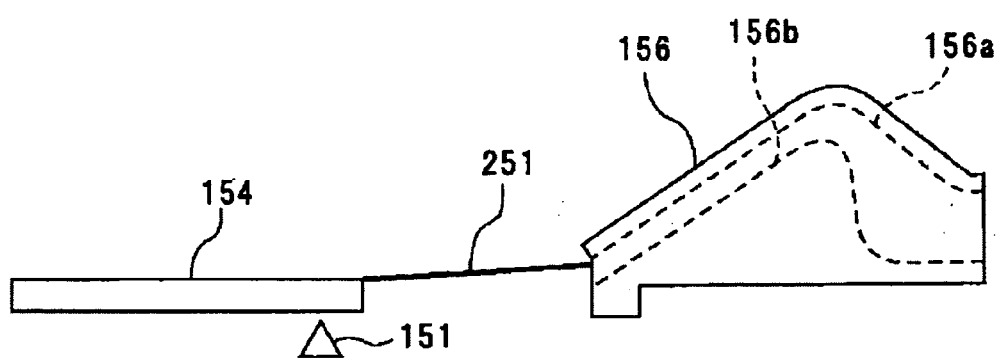
FIG. 8 is an explanatory diagram that illustrates the configuration of the periphery of a first-surface fixed read unit.

FIG. 8 is an enlarged configuration diagram that illustrates the periphery of the first-surface fixed read unit 151.

As illustrated in FIG. 8, the flexible guide member 251 that is made of a flexible material is arranged between the first contact glass 154 and the scoop guide member 156 that is a downstream-side guide member. The original conveying-direction upstream-side end of the flexible guide member 251 that is an intermediate guide member is fixed to the original conveying-direction downstream end of the first contact glass 154 by a method such as bond. The original conveying-direction downstream end of the flexible guide member 251 is a free end and is movably placed on a guide surface 156b of the scoop guide member 156.

Figure 9:
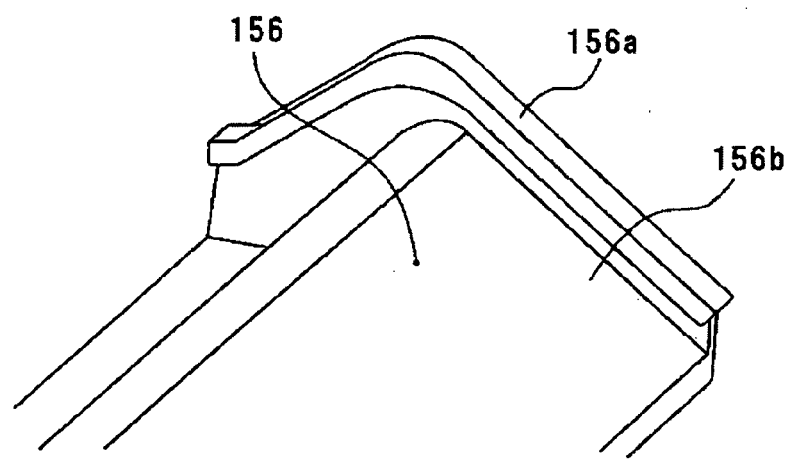
FIG. 9 is a perspective view that illustrates the configuration of a scoop guide member.

FIG. 9 is a perspective view of the scoop guide member 156. As illustrated in the figure, guide rails 156a that have a substantially square U shape are arranged on both main scanning-line direction ends of the scoop guide member 156. Both main-scanning direction ends of the flexible guide member 251 freely fit into the guide rails 156a. Thus, the flexible guide member 251 is guided by the guide rails 156a and moved along the guide surface 156b of the scoop guide member 156.

It is preferable that the flexible guide member 251 has a conductive property. When the flexible guide member 251 and the original slide over each other, there is a possibility that the flexible guide member 251 is charged due to friction. If the flexible guide member 251 is charged due to friction, an electrostatic force acts which causes the original to stick to the flexible guide member 251, whereby there is a possibility that the original conveying speed is reduced. Therefore, if the flexible guide member 251 has a conductive property, the electric charge, which has moved to the flexible guide member 251 due to the sliding with the original, flow into a different member so that it is possible to prevent the friction charge of the flexible guide member 251 and prevent the decrease in the original conveying speed.

Figure 10:
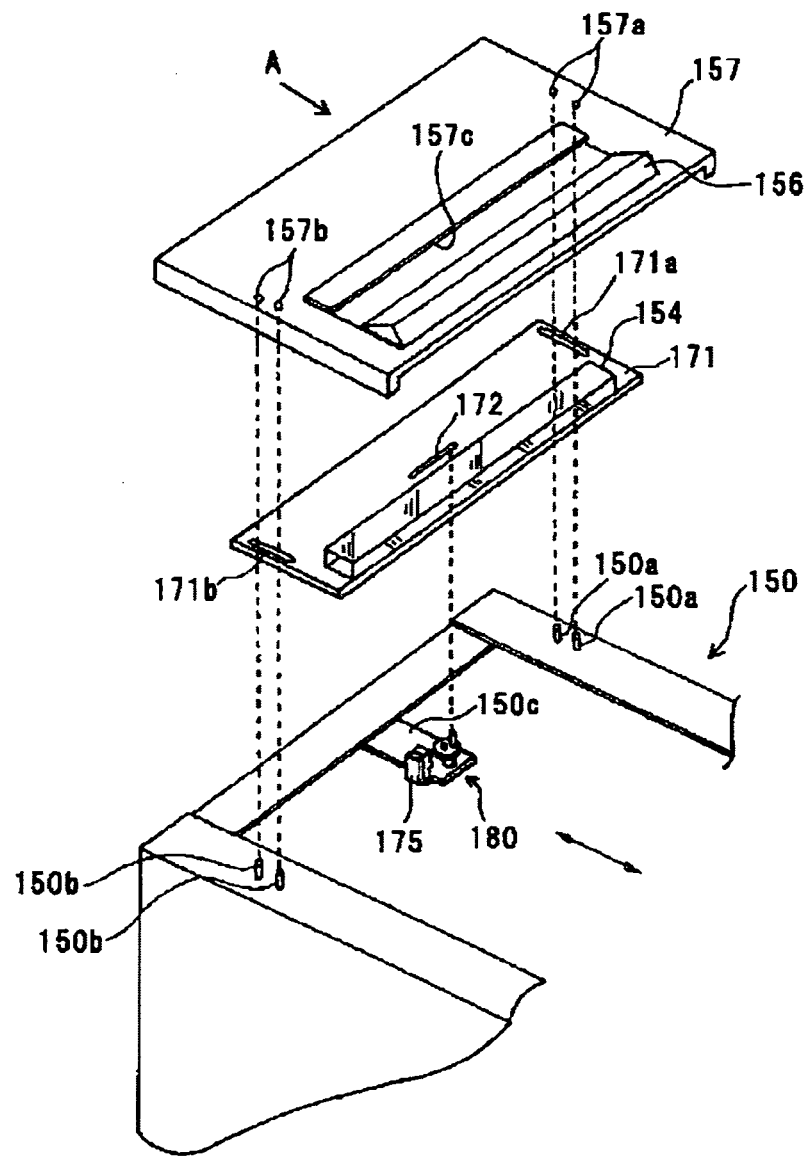
FIG. 10 is a perspective view that illustrates the exploded configuration of the periphery of the first-surface fixed read unit.

FIG. 10 is an exploded perspective view of the periphery of the first-surface fixed read unit 151.

As illustrated in FIG. 10, the first contact glass 154 is fixed such that it covers a rectangular window frame arranged on a plate-like fixed member 171. Elongated holes 171a, b that each extend in the sub-scanning direction are formed near both main-scanning direction ends of the fixed member 171. Two positioning pins 150a, 150b are arranged on both main-scanning direction ends of the casing of the scanner 150, and the positioning pins 150a, 150b are inserted into the elongated holes 171a, 171b of the fixed member 171. Thus, the first contact glass 154 is supported such that it can slide within a predetermined range in the sub-scanning direction with respect to the casing of the scanner 150. The fixed member 171 is covered with the cover member 157 that covers the periphery of the first-surface fixed read unit 151 on the top surface of the scanner 150. A rectangular through-hole 157c is formed on the cover member 157 to pass the light emitted from the first-surface fixed read unit 151 and the reflected light reflected by the original image surface, and the scoop guide member 156 is formed on the original conveying-direction downstream side of the through-hole 157c to scoop the leading edge of the original. Furthermore, positioning holes 157a, 157b into which the leading edges of the above-described positioning pins 150a, 150b fit are formed near both main-scanning direction ends of the cover member 157. The leading edges of the above-described positioning pins 150a, 150b fixedly fit into the positioning holes 157a, 157b of the cover member 157 so that the first contact glass 154 is fixed to the scanner 150 such that it can slide within a predetermined range.

A glass moving mechanism 180 that is a contact-glass moving unit to move the first contact glass 154 back and forth is arranged on the casing of the scanner 150.

Figure 11:
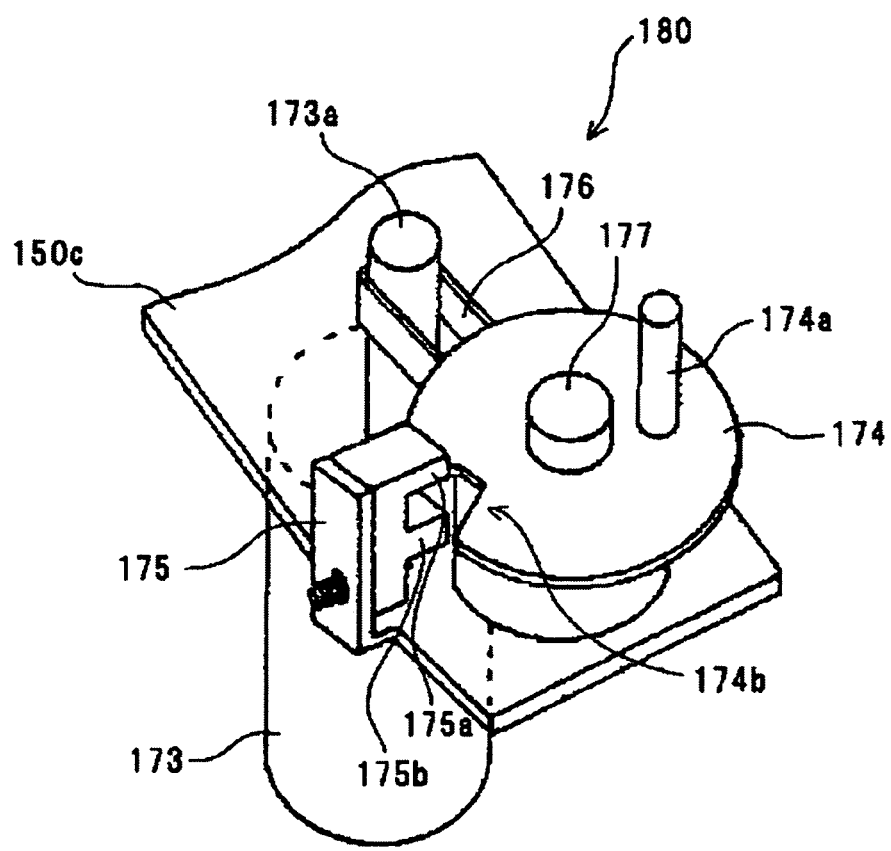
FIG. 11 is a perspective view that illustrates the configuration of a glass moving mechanism.

FIG. 11 is a perspective view of the glass moving mechanism 180.

The glass moving mechanism 180 includes a rotating cam 174 arranged on a shaft 177, a cam drive motor 173, a timing belt 176, and the like. The rotating cam 174 is rotatably supported by a support board 150c arranged on the casing of the scanner 150. An undepicted through-hole is arranged on the support board 150c and the cam drive motor 173 is fixed to the casing of the scanner 150 such that a motor shaft 173a of the cam drive motor 173 is inserted into the through-hole from the lower side to the upper side. The timing belt 176 is placed between the motor shaft 173a and the rotating cam 174. A stepping motor is used as the cam drive motor 173.

A drive transmission pin 174a is arranged on the rotating cam 174. As illustrated in FIG. 10, the drive transmission pin 174a is inserted into an elongated hole 172 that is arranged in a substantially main-scanning direction middle area of the fixed member 171 and extends in the main scanning direction. Furthermore, a notch 174b is formed on the rotating cam 174. A home-position sensor 175 is fixed to the support board 150c. The home-position sensor 175 is a transmission-type sensor, and a light emitting unit 175a and a light receiving unit 175b are opposed to each other with the rotating cam 174 interposed therebetween. The home-position sensor 175 detects that the first contact glass 154 is in the home position when the notch 174b of the rotating cam 174 reaches the opposed position of the light emitting unit 175a and the light receiving unit 175b of the home-position sensor 175 and the light from the light emitting unit 175a is received by the light receiving unit 175b.

If the drive is transmitted from the cam drive motor 173 to the rotating cam 174 via the timing belt 176 under the control of the main-body control unit 200, the rotating cam 174 is rotated around the shaft 177. The rotary drive of the rotating cam 174 is driven from the drive transmission pin 174a to the fixed member 171 via the elongated hole 172 of the fixed member 171 so that the fixed member 171 is moved back and forth in the sub-scanning direction (the original conveying direction). The fixed member 171 is moved back and forth so that the first contact glass 154 fixed to the fixed member 171 is moved back and forth in the sub-scanning direction. The above-described glass moving mechanism 180 is an example and, for example, the glass moving mechanism 180 may be constituted by a rack-and-pinion.

Next, an explanation will be given of the movement control of the first contact glass 154.

Figure 12:
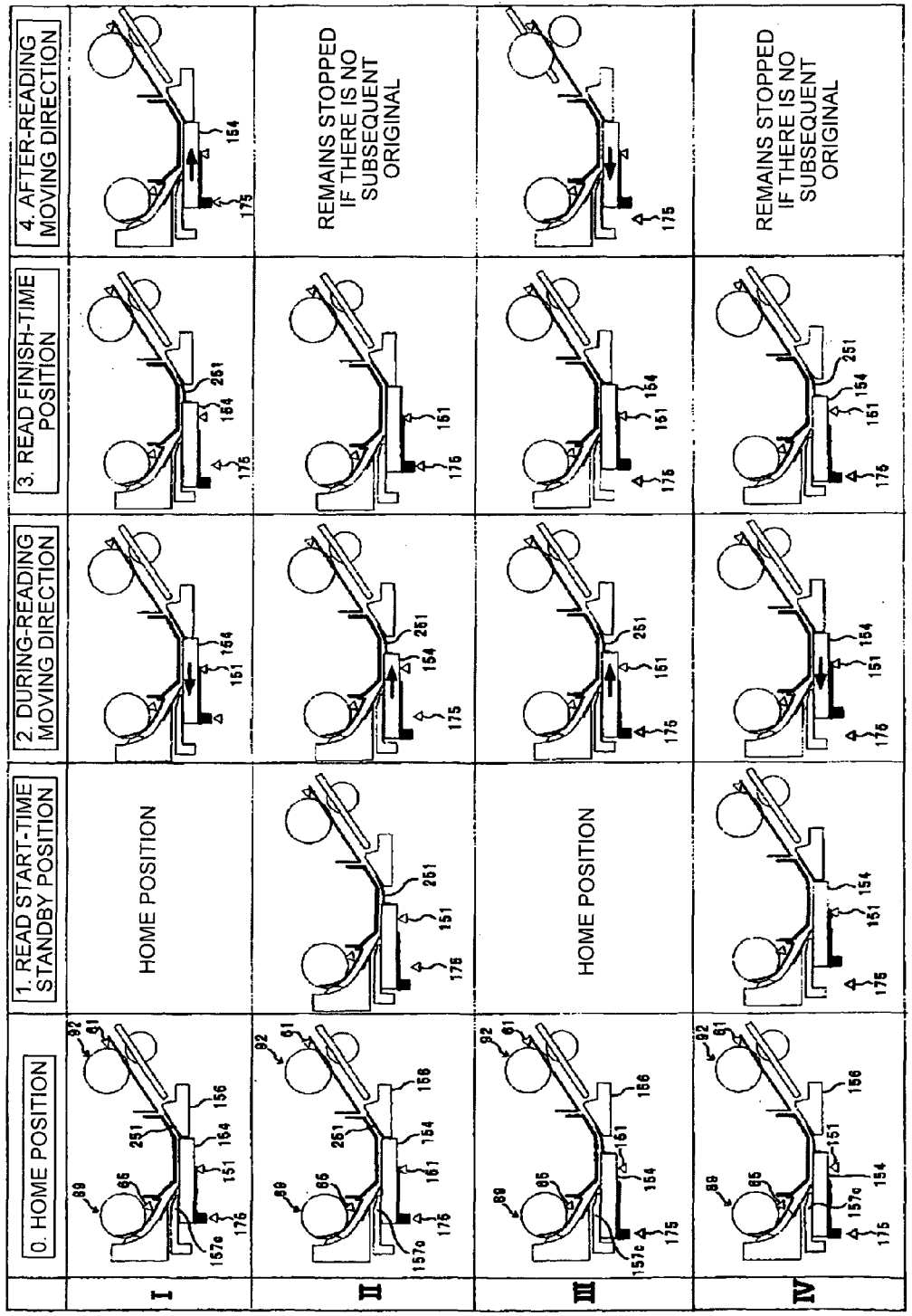
FIG. 12 is an explanatory diagram that illustrates the movement patterns of a first contact glass.

As illustrated in FIG. 12, there are four patterns as the movement pattern of the first contact glass 154.

[Pattern I]

The pattern I is a pattern in which the home position of the first contact glass 154 is at the most downstream position in the original conveying direction in the movable range of the first contact glass 154 and the moving direction of the first contact glass 154 during reading of the original is in the direction opposite to the original conveying direction.

In this pattern, the first contact glass 154, which is located in the home position, is moved in the direction opposite to the original conveying direction at the timing in which the leading edge of the original reaches the read position or the timing just before the leading edge of the original reaches the read position. When the reading of the original is finished, the first contact glass 154 is moved to the most upper stream in the original conveying direction in the movable range of the first contact glass 154 and, afterwards, is moved in the same direction as the original conveying direction to return to the home position.

[Pattern II]

The pattern II is a pattern where the home position of the first contact glass 154 is at the most downstream position in the original conveying direction in the movable range of the first contact glass 154 and the moving direction of the first contact glass 154 during reading of the original is in the same direction as the original conveying direction.

In this pattern, when the start key for reading the original is pressed, first, the first contact glass 154 is moved to the read start-time standby position at the most upper stream in the original conveying direction in the movable range of the first contact glass 154. Then, the first contact glass 154, which stands by in the read start-time standby position, is moved in the same direction as the original conveying direction at the timing in which the leading edge of the original reaches the read position or the timing just before the leading edge of the original reaches the read position. When the reading of the original is finished, the first contact glass 154 is moved to the least lowest stream in the original conveying direction in the movable range of the first contact glass 154 and, if there is no subsequent original, the first contact glass 154 remains stopped and, if there is a subsequent original, it is moved to the read start-time standby position.

[Pattern III]

The Pattern III is a pattern in which the home position of the first contact glass 154 is at the most upstream position in the original conveying direction in the movable range of the first contact glass 154 and the moving direction of the first contact glass 154 during reading of the original is in the same direction as the original conveying direction.

In this pattern, the first contact glass 154, which is located in the home position, is moved in the same direction as the original conveying direction at the timing in which the leading edge of the original reaches the read position or the timing just before the leading edge of the original reaches the read position. When the reading of the original is finished, the first contact glass 154 is moved to the least lowest stream in the original conveying direction in the movable range of the first contact glass 154 and, afterwards, is moved in the direction opposite to the original conveying direction to return to the home position.

[Pattern IV]

The pattern IV is a pattern in which the home position of the first contact glass 154 is at the most upstream position in the original conveying direction in the movable range of the first contact glass 154 and the moving direction of the first contact glass 154 during reading of the original is in the direction opposite to the original conveying direction.

In this pattern, when the start key for reading the original is pressed, first, the first contact glass 154 is moved to the read start-time standby position at the least lowest stream in the original conveying direction in the movable range of the first contact glass 154. Then, the first contact glass 154, which stands by in the read start-time standby position, is moved in the direction opposite to the original conveying direction at the timing in which the leading edge of the original reaches the read position or the timing just before the leading edge of the original reaches the read position. When the reading of the original is finished, the first contact glass 154 is moved to the most upper stream in the original conveying direction in the movable range of the first contact glass 154 and, if there is no subsequent original, the first contact glass 154 remains stopped and, if there is a subsequent original, it is moved to the read start-time standby position.

Figure 13:
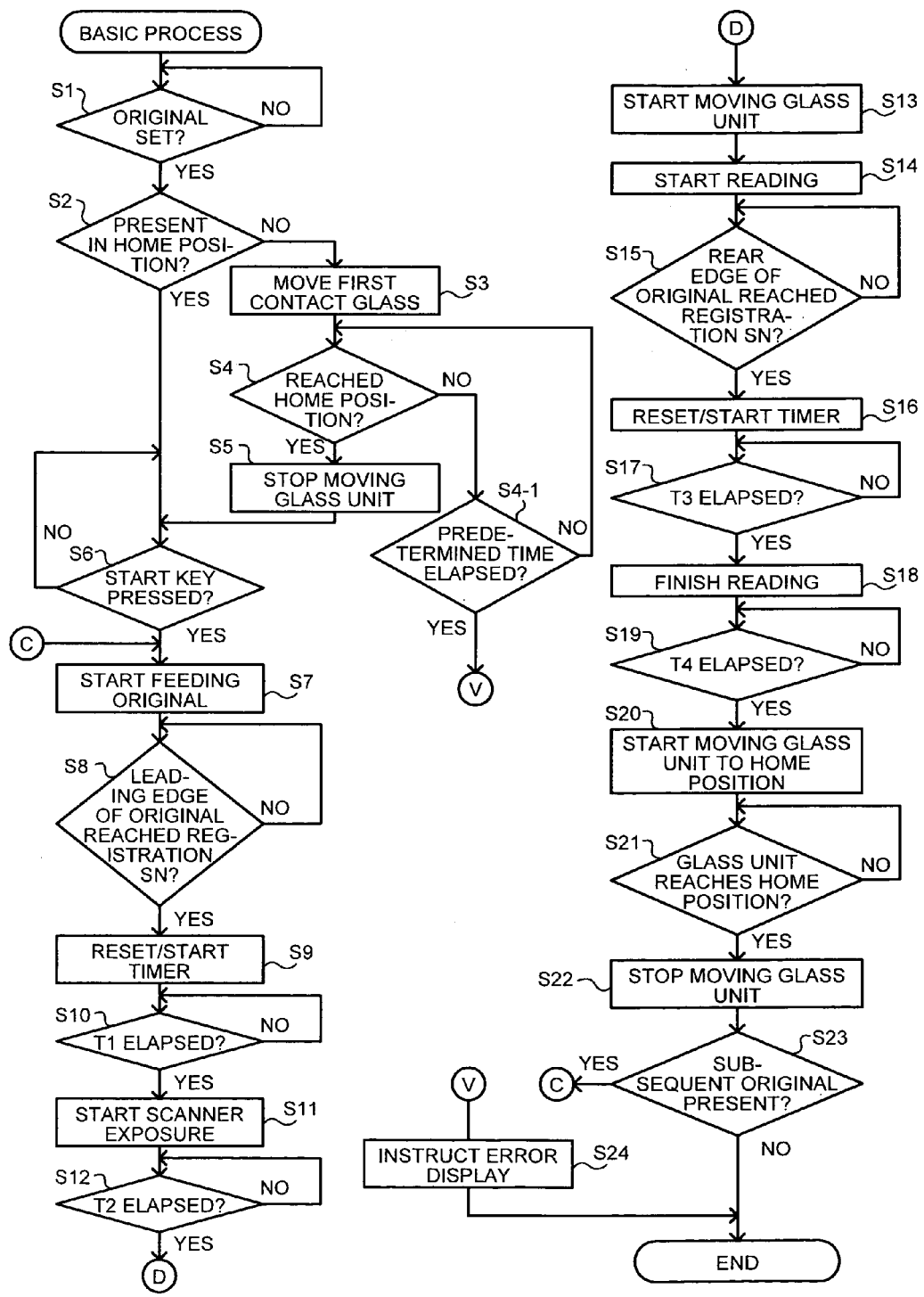
FIG. 13 is a flowchart that illustrates the movement control of the first contact glass in the pattern I and the pattern III.

FIG. 13 is a flowchart that illustrates the movement control of the first contact glass 154 (glass unit) in the pattern I and the pattern III described above.

If the original set sensor 63 detects that the original MS is set on the original placement board 53 (Yes at S1), the main-body control unit 200 refers to the home-position sensor 175 and detects whether the first contact glass 154 is in the home position or not (S2). If the first contact glass 154 is not in the home position (No at S2), the first contact glass 154 is moved to the home position (S3 to S5). In the case of the above-described pattern I, the first contact glass 154 is moved in the same direction as the original conveying direction. In the case of the pattern III, the first contact glass 154 is moved in the direction opposite to the original conveying direction. On the other hand, because a problem occurs in the glass moving mechanism 180 if the home-position sensor 175 does not detect that the first contact glass 154 has reached the home position although a predetermined time has elapsed (YES at S4-1), an error display instruction (S24) is performed and it is terminated.

If the first contact glass 154 is in the home position and the main-body control unit 200 detects that the start key is pressed (YES at S6), the feeding of the original MS is started (S7) and, if the registration sensor 65 detects the leading edge of the original (YES at S8), a timer is reset and started (S9). Next, if a predetermined time T1 second elapses on the timer (YES at S10), the exposure of the first-surface fixed read unit 151 is started (S11). The predetermined time T1 is, for example, the time from when the registration sensor 65 detects the leading edge of the original to when the main-body control unit 200 sends a read start signal to the controller 64. Next, if a predetermined time T2 elapses on the timer (S12), the movement of the first contact glass 154 is started (S13). In the case of the above-described pattern I, the first contact glass 154 is moved in the direction opposite to the original conveying direction. In the case of the above-described pattern III, the first contact glass 154 is moved in the same direction as the original conveying direction. The predetermined time T2 is the time from when the registration sensor 65 detects the leading edge of the original to when the leading edge of the original reaches the read position.

Furthermore, a gate signal is sent at the timing in which the leading edge of the original reaches the read position so that the image reading by the first-surface fixed read unit 151 is started (S14). Then, if the registration sensor 65 detects the rear edge of the original (YES at S15), the timer is reset and restarted (S16). If the predetermined time T3 has elapsed on the timer (YES at S17), the sending of the gate signal is terminated and the read operation by the first-surface fixed read unit 151 is terminated (S18). The predetermined time T3 is the time from when the registration sensor 65 detects the rear edge of the original to when the rear edge of the original MS passes through the read position. Next, if a predetermined time T4 has elapsed on the timer (YES at S19), the first contact glass 154 is moved to the home position (S20). The predetermined time T4 is, for example, the timing in which the rear edge of the original reaches the scoop guide member 156. Then, if the home-position sensor 175 detects that the first contact glass 154 reaches the home position (YES at S21), the movement of the first contact glass 154 is stopped (S22) and, if there is a subsequent original (YES at S23), the steps after S7 are performed again and, if there is not (NO at S23), the operation is terminated.

Figure 14:
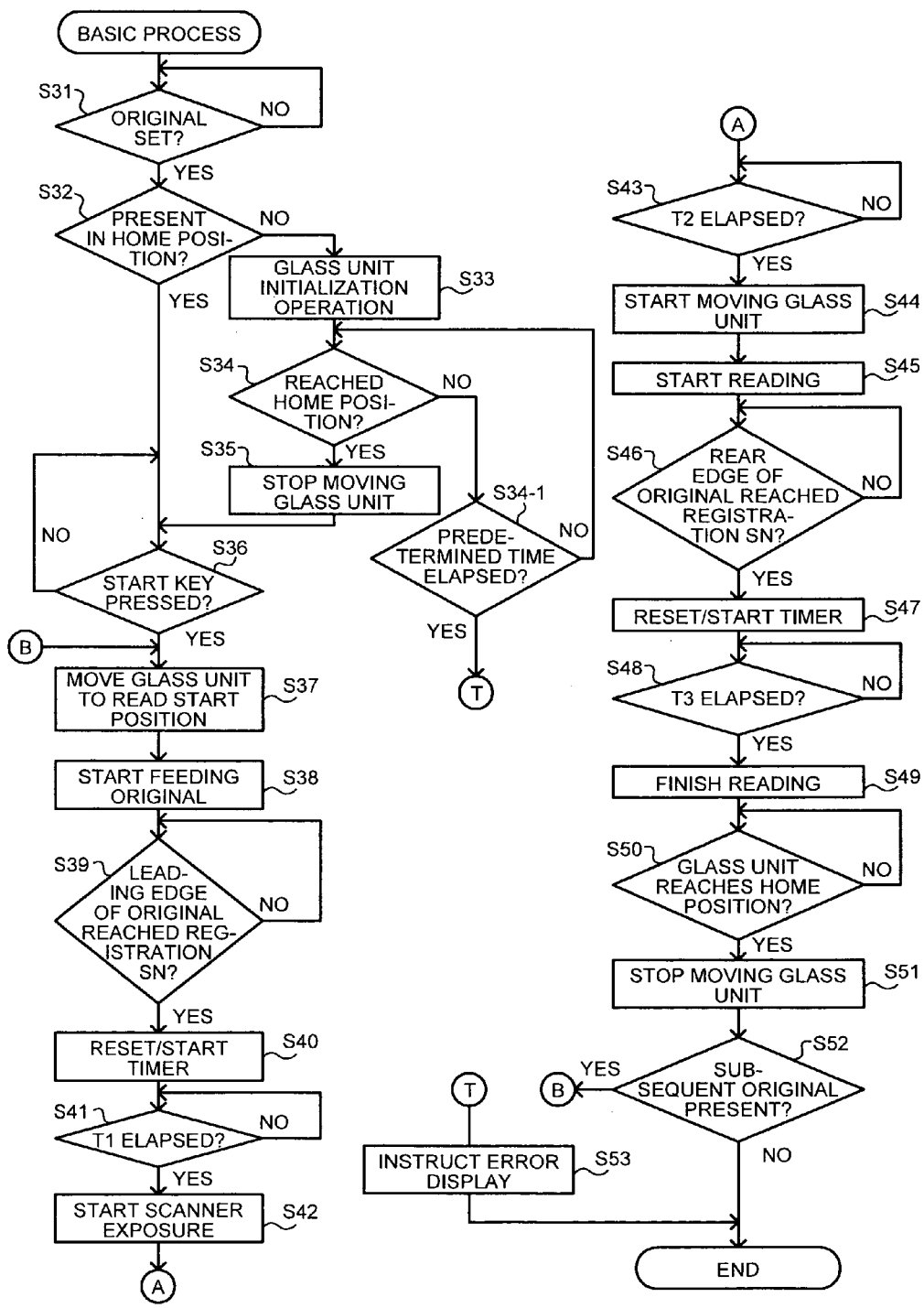
FIG. 14 is a flowchart that illustrates the movement control of the first contact glass in the pattern II and the pattern IV.

FIG. 14 is a flowchart that illustrates the movement control of the first contact glass 154 in the pattern II and the pattern IV described above.

As illustrated in FIG. 14, in the case of the pattern II and the pattern IV described above, unlike FIG. 13, the main-body control unit 200 detects that the start key is pressed (YES at S36) and, before the feeding of the original MS is started (S38), control is additionally performed to move the first contact glass 154 to the read-start standby position (S37). In the case of the above-described pattern II, the first contact glass 154 is moved in the direction opposite to the original conveying direction. In the case of the above-described pattern IV, it is moved in the same direction as the original conveying direction.

Furthermore, as illustrated in FIG. 14, in the case of the pattern II and the pattern IV described above, the control of moving the first contact glass 154 to the home position after the reading of the original is finished (S49) is not performed. The subsequent control is the same as the control in FIG. 13.

As illustrated in FIG. 13 and FIG. 14, according to the present embodiment, the first contact glass 154 is moved in the same direction as the original conveying direction at the timing in which the leading edge of the original reaches the read position so that the reading of the original image is always performed at a different position of the first contact glass 154. As a result, it is possible to prevent the degradation of image quality due to a longitudinal line even if there is attachment such as dust or dirt on the original conveyance surface of the first contact glass 154.

Furthermore, at that time, the flexible guide member 251 is moved in the same direction as the original conveying direction together with the first contact glass 154. Because the original conveying-direction downstream end of the flexible guide member 251 is a free end, if the flexible guide member 251 is moved in the same direction as the original conveying direction, the original conveying-direction downstream side of the flexible guide member 251 is moved in the same direction as the original conveying direction along the guide surface 156b of the scoop guide member 156 while being guided by the guide rails 156a. Therefore, even during reading of the original image, a part of the flexible guide member 251 pulled out from the scoop guide member 156 can be maintained in a state substantially parallel to the original conveyance surface of the first contact glass 154 without being largely curved toward the original conveyance path. Thus, it is possible to prevent the floating of the original from the first contact glass 154 at the read position. As a result, at the read position, the original can be conveyed in a state where the distance between the read surface of the conveyed original and the first-surface fixed read unit 151 is substantially constant and the quality degradation of the read image can be prevented.

Next, an explanation will be given of the movement control (hereinafter, referred to as error processing) of the first contact glass 154 if the original conveyance is interrupted because an original jam occurs in the ADF 51, the ADF 51 is opened during the original conveyance, or an original conveyance interruption instruction is issued.

If the control of returning the first contact glass 154 to the home position is performed in a state where the original is stopped in the positions illustrated in FIG. 18A to FIG. 21C, the original can be damaged. Therefore, according to the present embodiment, it is determined whether the control of returning the first contact glass 154 to the home position is performed or not in accordance with the stop position of the original.

Figure 15:
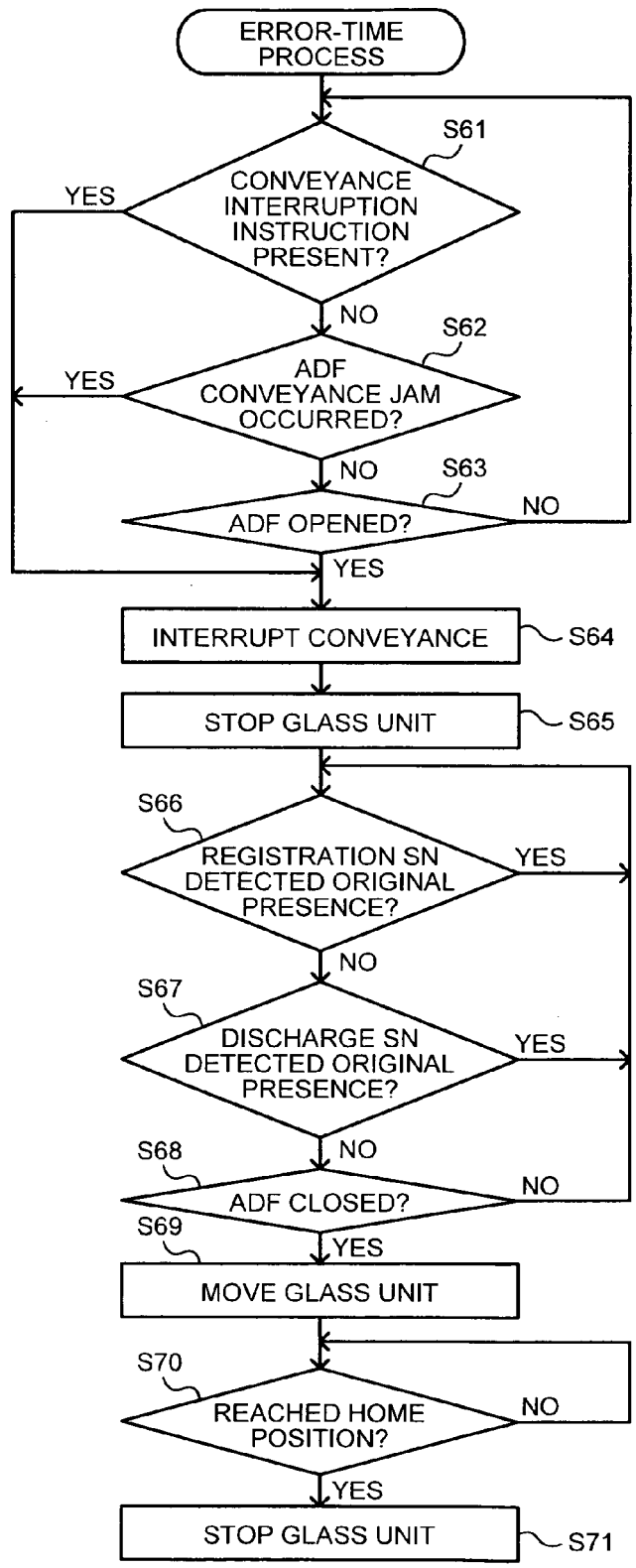
FIG. 15 is a flowchart that illustrates error processing in the pattern III and the pattern IV.

FIG. 15 is a flowchart that illustrates the control of the error processing when the home position is at the most upstream position in the original conveying direction in the movable range of the first contact glass 154 as in the above-described pattern III and the above-described pattern IV.

As illustrated in the figure, the main-body control unit 200 stops the conveyance of the original (S64) and stops the movement of the first contact glass 154 (S65) if an original conveyance interruption instruction is issued (YES at S61), if an original jam occurs in the ADF 51 (YES at S62), or if the ADF is opened during the original conveyance (YES at S63).

Figure 20A:
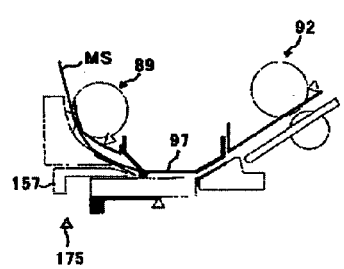
FIGS. 20A to 20C are an explanatory diagram that illustrates an example of a problem in the case where the moving direction to the home position is in the direction opposite to the original conveying direction.
Figure 20B:
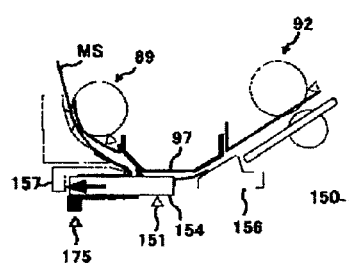
Figure 20C:
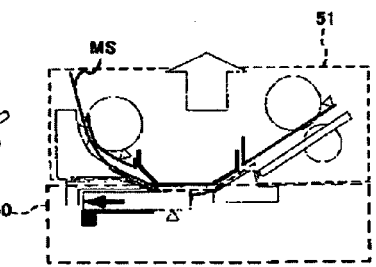

Then, the main-body control unit 200 refers to the registration sensor 65 and examines whether the registration sensor 65 detects the presence of an original or not (S66). If the registration sensor 65 detects the presence of an original, the original can be stopped in the state previously illustrated in FIGS. 20A to 20C. Therefore, if the first contact glass 154 is moved in this state in the direction opposite to the original conveying direction in order to return the first contact glass 154 to the home position, as illustrated in FIG. 20B, there is a possibility that the leading edge of the original is bent over and is jammed between the first contact glass 154 and the cover member 157. Therefore, if the registration sensor 65 detects the presence of an original (YES at S66), the control of returning the first contact glass 154 to the home position is not performed.

Figure 21A:
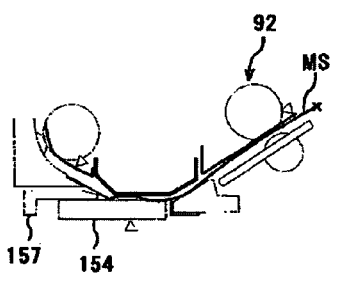
FIGS. 21A to 21C are an explanatory diagram that illustrates another example of the problem in the case where the moving direction to the home position is in the direction opposite to the original conveying direction.
Figure 21B:
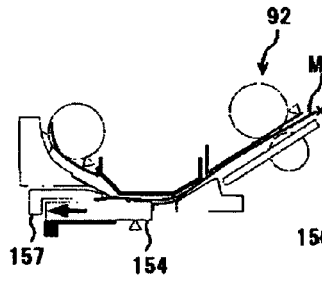
Figure 21C:
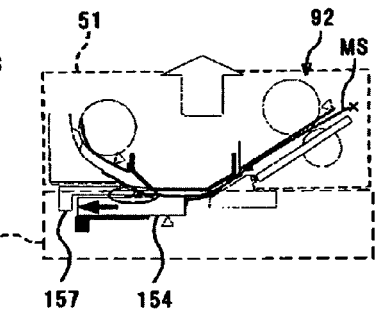

Moreover, the main-body control unit 200 refers to the discharge sensor 61 and examines whether the discharge sensor 61 detects the presence of an original or not (S67). If the discharge sensor 61 detects the presence of an original, the original can be stopped in the state previously illustrated in FIG. 21A. Therefore, if the first contact glass 154 is moved in this state in the direction opposite to the original conveying direction in order to return the first contact glass 154 to the home position, as illustrated in FIG. 21B, there is a possibility that the rear edge of the original is jammed between the first contact glass 154 and the cover member 157. Therefore, if the discharge sensor 61 detects the presence of an original (YES at S67), the control of returning the first contact glass 154 to the home position is not performed.

Furthermore, the main-body control unit 200 checks whether the ADF 51 is closed or not (S68). If the control of returning the first contact glass 154 to the home position is performed when the ADF 51 is opened, and if the user carelessly places an object on the first contact glass 154, there is a possibility that the object becomes jammed between the first contact glass 154 and the cover member 157. As a result, there is a possibility that the object is damaged or the surface of the first contact glass 154 is damaged. Therefore, if the ADF 51 is opened (NO at S68), the control of returning the first contact glass 154 to the home position is not performed.

On the other hand, if both the registration sensor 65 and the discharge sensor 61 do not detect the original (NO at S66, NO at S67) and if the ADF 51 is closed (YES at S68), because there is no possibility that the original is damaged, or the like, even if the first contact glass 154 is moved to the home position, the main-body control unit 200 performs the control of returning the first contact glass 154 to the home position (S69 to S71).

Thus, according to the present embodiment, the control of returning the first contact glass 154 to the home position is performed only if there is no possibility that the original is damaged or the surface of the first contact glass 154 is damaged even though the first contact glass 154 is moved to the home position and, if there is a possibility of damage, the execution of the control of returning it to the home position is prevented so that it is possible to prevent damage to the original or the first contact glass 154.

Next, an explanation will be given of the error processing if the home position is at the most downstream position in the original conveying direction in the movable range of the first contact glass 154 as in the above-described pattern I and the above-described pattern II.

Figure 16:
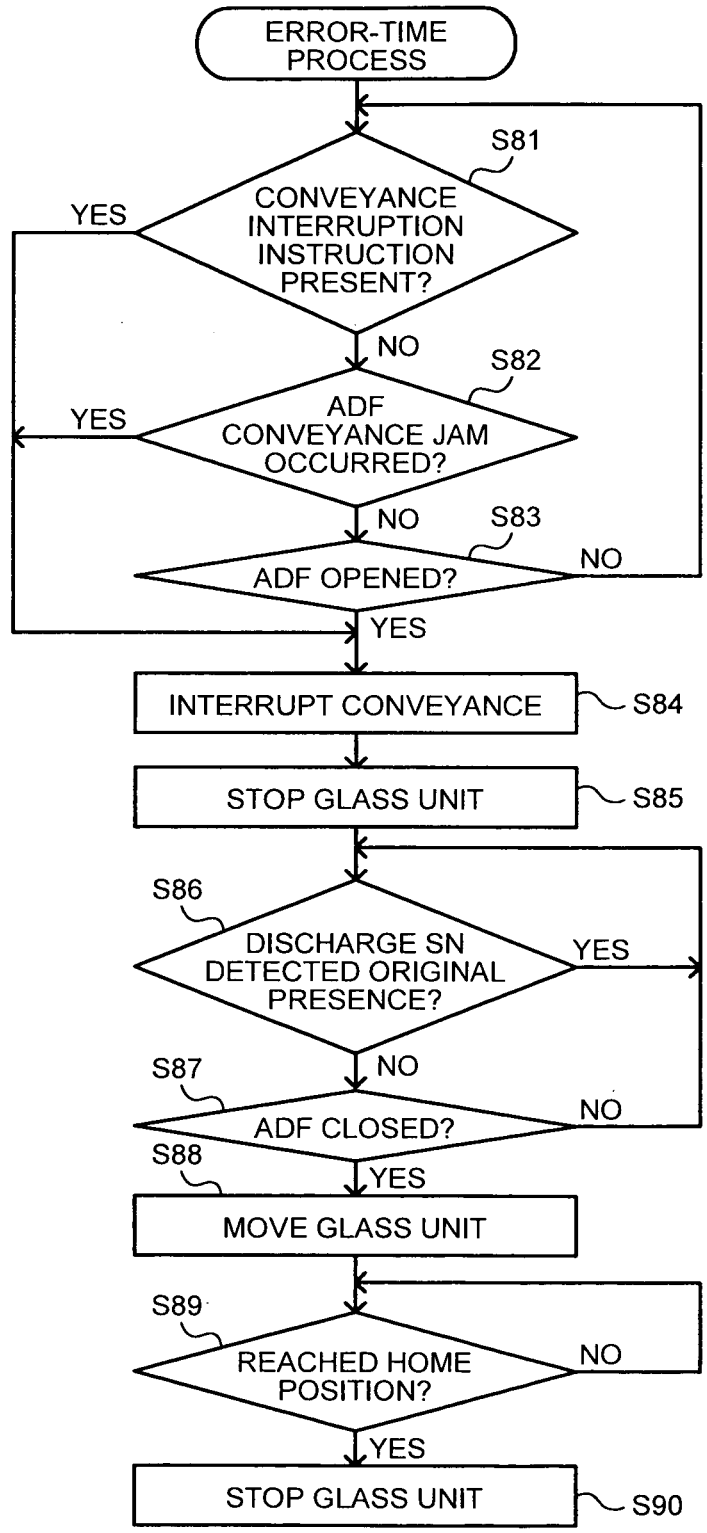
FIG. 16 is a flowchart that illustrates the error processing in the pattern I and the pattern II.

FIG. 16 is a flowchart that illustrates the control of the error processing in the case of the above-described pattern I and the above-described pattern II.

As illustrated in FIG. 16, in the error processing in the case of the above-described pattern I and the above-described pattern II, the main-body control unit 200 does not perform the control of examining whether the registration sensor 65 detects the presence of an original or not by referring to the registration sensor 65. Even if the original is stopped in the state previously illustrated in FIG. 20A, because the first contact glass 154 returns to the home position in the same direction as the original conveying direction, the leading edge of the original is not bent over to be jammed between the first contact glass 154 and the cover member 157, as illustrated in FIG. 20B. Therefore, as in the above-described pattern I and the above-described pattern II, if the home position is at the most downstream position in the original conveying direction in the movable range of the first contact glass 154 and if the ADF 51 is closed and the discharge sensor 61 does not detect the presence of an original, the control of returning the first contact glass 154 to the home position is performed even if the registration sensor 65 detects the presence of an original.

On the other hand, as in the above-described pattern I and the above-described pattern II, even if the home position is at the most downstream position in the original conveying direction in the movable range of the first contact glass 154, if the discharge sensor 61 detects the presence of an original, the control of returning the first contact glass 154 to the home position is not performed. If the discharge sensor 61 detects the presence of an original, there is a possibility that the original is stopped in the state previously illustrated in FIG. 18A or FIG. 19A. Therefore, if the first contact glass 154 is moved in the same direction as the original conveying direction in a state where the original is stopped as in FIG. 18A or FIG. 19A in order to return the first contact glass 154 to the home position, as previously illustrated in FIG. 18B or FIG. 19B, there is a possibility that the original is bent over and becomes crumpled in the conveying path and the original is damaged. Therefore, if the discharge sensor 61 detects the presence of an original, the control of returning the first contact glass 154 to the home position is not performed.

As described above, in the case of the above-described pattern I and the above-described pattern II, the error processing is performed as in FIG. 16 so that it is possible to prevent the execution of the control of returning it to the home position and prevent the damage to the original or the first contact glass 154.

Furthermore, as in the above-described pattern III and the above-described pattern IV, if the home position is at the most upstream position in the original conveying direction in the movable range of the first contact glass 154, it can be determined whether the first contact glass 154 is to be returned to the home position or not in accordance with the moving direction of the first contact glass 154 when an event causing the interruption of original conveyance occurs.

Figure 17:
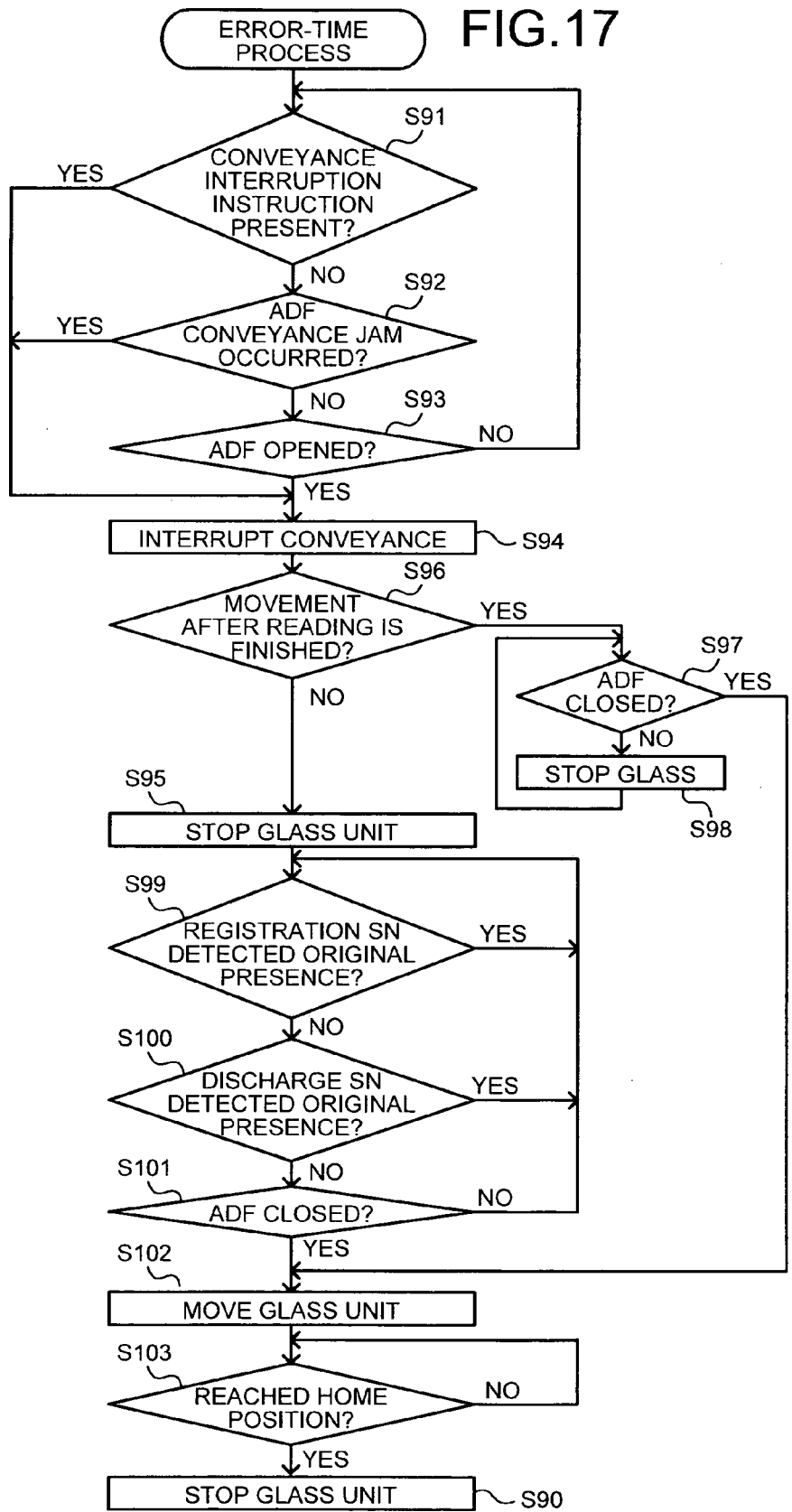
FIG. 17 is a flowchart that illustrates another example of the error processing in the pattern III and the pattern IV.
Figure 18A:
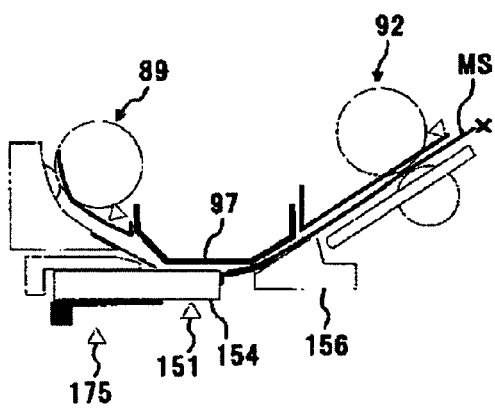
FIGS. 18A and 18B are an explanatory diagram that illustrates an example of a problem in the case where the moving direction to the home position is in the same direction as the original conveying direction.
Figure 18B:
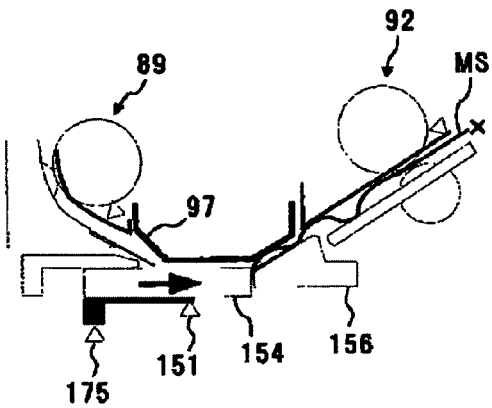
Figure 19A:
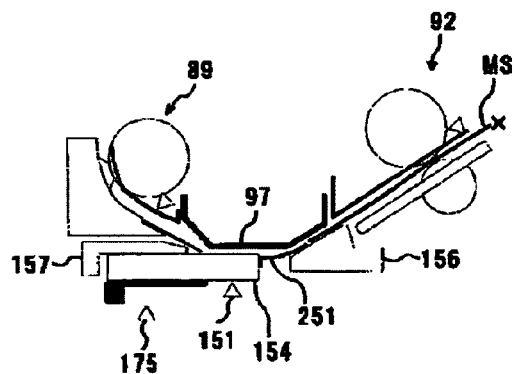
FIGS. 19A and 19B are an explanatory diagram that illustrates another example of the problem in the case where the moving direction to the home position is in the same direction as the original conveying direction.
Figure 19B:
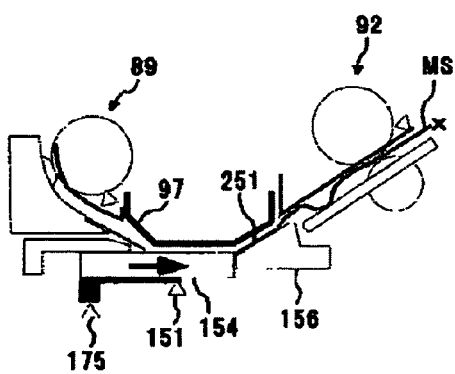

FIG. 17 is a flowchart that illustrates another example of the error processing in the case of the above-described pattern III and the above-described pattern IV.

If an event causing the interruption of original conveyance occurs and the conveyance of the original is interrupted, the main-body control unit 200 examines whether the movement of the first contact glass 154 is the movement after the reading is finished or not. In the case of the above-described pattern III, it is the movement (S20 in FIG. 13 previously illustrated) to the home position after the reading is finished and, in the case of the above-described pattern IV, it is the movement (S37 in FIG. 14 previously illustrated) to the read-start standby position. If the movement of the first contact glass 154 is the movement after the reading is finished, the rear edge of the original passes through at least the read position. Furthermore, if the movement of the first contact glass 154 is the movement after the reading is finished, the original is not conveyed toward the read position on the first contact glass 154. Therefore, even if the original conveyance is stopped when the movement of the first contact glass 154 is the movement after the reading is finished, the original is not stopped in the state in FIG. 20A or FIG. 21A. Therefore, in this case, if the movement control to the home position is performed, it is not as in FIG. 20B or FIG. 21B. Therefore, if the ADF 51 is closed and it is the movement to the home position after the reading is finished, the movement control to the home position is performed. In the case of the above-described pattern III, the movement of the first contact glass 154 is continued without change. On the other hand, in the case of the above-described pattern IV, the movement of the first contact glass 154 is temporarily stopped and the movement to the home position is performed.

On the other hand, the same control as in FIG. 15 described above is performed except when the first contact glass 154 is moved after the reading is finished.

As in the above-described pattern III and the above-described pattern IV, if the home position is at the most upstream position in the original conveying direction in the movable range of the first contact glass 154, the error processing in FIG. 17 is performed so that it is possible to prevent damage to the original or the first contact glass 154 and prevent the control of returning it to the home position from being executed during the image reading after an event causing the interruption of original conveyance is resolved.

Furthermore, it is preferable that the home position is set in the original conveying-direction downstream side in the movable range of the first contact glass 154 as in the above-described patterns I and II. The home position is set in the original conveying-direction downstream side in the movable range of the first contact glass 154 so that, when the first contact glass 154 returns to the home position, the most area of the flexible guide member 251 is placed along the guide surface of the scoop guide member 156, whereby, when the ADF 51 is opened in a state where the power is turned off, even if the user touches the flexible guide member 251, the guide surface 156b of the scoop guide member 156 functions as a holder and the deformation of the flexible guide member 251 is prevented.

As described above, the original read device 50 that is an image read device according to the present embodiment is the sheet-through type original read device 50 that conveys the original to the first-surface fixed read unit 151 that is the read unit while reading the original image at the read position on the first contact glass 154 that is a transparent member. Furthermore, the original read device 50 according to the present embodiment includes the glass moving mechanism 180 that is a moving unit to move the first contact glass 154 back and forth in the original conveying direction and the main-body control unit 200 that is a control unit that conveys the original and moves the first contact glass 154 by using the glass moving mechanism 180 while causing the images to be read at the read position. When an event causing the interruption of original conveyance occurs, the main-body control unit 200 that is a determining unit stops the first contact glass 154 and determines whether the control of returning the first contact glass 154 to the home position is to be performed or not in accordance with the stop position of the original in the original conveying path.

With such a configuration, the control of returning the first contact glass 154 to the home position is performed only when there is no possibility that the original will be damaged even if the first contact glass 154 is moved to the home position, whereby it is possible to prevent damage to the original or the first contact glass 154 and prevent the control of returning it to the home position from being executed during the image reading after an event causing the interruption of original conveyance is resolved.

Furthermore, the main-body control unit 200 determines whether the control of returning the first contact glass 154 to the home position is to be performed or not in accordance with detection results of the registration sensor 65 that is the upstream-side original detection sensor closest to the read position among original detection sensors on the upstream side in the original conveying direction from the read position and the discharge sensor 61 that is the downstream-side original detection sensor closest to the read position among original detection sensors on the downstream side in the original conveying direction from the read position.

Thus, the presence or absence of an original on the periphery of the first contact glass 154 can be determined and the control of moving the first contact glass 154 to the home position is not performed if there is a possibility that the original will be damaged.

If either one of the registration sensor 65 and the discharge sensor 61 detects the presence of an original, the main-body control unit 200 determines that the control of returning the first contact glass 154 to the home position is not to be performed. There is a possibility that the original is stopped in the state previously illustrated in FIG. 20A if the registration sensor 65 detects the presence of an original; therefore; when the registration sensor 65 detects the presence of an original, the movement of the first contact glass 154 to the home position is not performed, whereby it is possible to prevent the state illustrated in FIG. 20B and prevent damage to the original. Furthermore, if the discharge sensor 61 detects the presence of an original, there is a possibility that the original is stopped in the state in FIG. 18A, FIG. 19A, or FIG. 21A. Therefore, if the discharge sensor 61 detects the presence of an original, the movement of the first contact glass 154 to the home position is not performed so that damage to the original can be prevented.

Moreover, if both the registration sensor 65 and the discharge sensor 61 detect the presence of an original, the movement of the first contact glass 154 to the home position is not performed. At that time, the vicinity of the middle area of the original is in a contact state with the first contact glass 154. If the first contact glass 154 is moved to the home position in such a state, the failure described below can occur. Specifically, if the home position is most downstream in the original conveying direction, the leading end of the flexible guide member 251 gets stuck in the vicinity of the middle area of the original so that there is a possibility that the middle area of the original as well as the flexible guide member 251 are moved to the original conveying-direction downstream side. As a result, in the same manner as in FIGS. 18B and 19B, there is a possibility that the original is folded up and becomes crumpled in the original conveying path. On the other hand, if the home position is most upstream in the original conveying direction, there is a possibility that the middle area of the original is moved in the direction opposite to the original conveying direction together with the first contact glass 154 and the vicinity of the middle area of the original is jammed between the cover member 157 and the first contact glass 154. Therefore, the first contact glass 154 is not moved to the home position if both the registration sensor 65 and the discharge sensor 61 detect the presence of an original. Thus, it is possible to prevent damage to the original.

Furthermore, if the home position is most upstream in the original conveying direction, it may be determined whether the control of returning the first contact glass 154 to the home position is to be performed or the movement of the first contact glass 154 is to be stopped in accordance with the moving direction of the first contact glass 154 when an event causing the interruption of original conveyance occurs.

If the moving direction of the first contact glass 154 when the event causing the interruption of original conveyance occurs is in the direction opposite to the moving direction during the image reading, at least the rear edge of the original is located on the original conveying-direction downstream side from the read position. Furthermore, because the original is conveyed to the read position after the movement of the first contact glass 154 in the direction opposite to the moving direction during the image reading is stopped, the leading edge of the original is not located in the vicinity of the original read position when it is moved in the direction opposite to the moving direction during the image reading. Furthermore, the moving direction when the first contact glass 154 returns to the home position is in the direction opposite to the original conveying direction. Therefore, there is no possibility that the original will be damaged even if the position of the rear edge of the original is in the state in FIG. 18A or FIG. 19A.

Therefore, if it is the direction opposite to the moving direction during the image reading, the control of returning it to the home position is performed. Thus, the first contact glass 154 can return to the home position without any damage to the original.

Furthermore, if the first contact glass 154 is moved to the home position when the ADF 51 that is the original conveying device is opened with respect to the scanner, there is a possibility that the user slides an object over the first contact glass 154 and the surface of the first contact glass 154 is damaged. Therefore, the main-body control unit 200 determines that the control of returning the first contact glass 154 to the home position is not to be performed when the ADF 51 is opened, whereby damage to the first contact glass 154 can be prevented.

Moreover, the flexible guide member 251 is provided whose original conveying-direction upstream end is in contact with the first contact glass 154 and whose original-conveying direction downstream end is movably placed on the guide surface 156b of the scoop guide member 156 that scoops up the leading edge of the original so that the flexible guide member 251 guides the conveyed original from the first contact glass 154 to the scoop guide member 156. Thus, the original-conveying direction downstream end of the flexible guide member 251 is movably placed on the guide surface 156b of the scoop guide member 156 so that the entire flexible guide member 251 can be moved together with the first contact glass 154. Therefore, if the first contact glass 154 is moved in the same direction as the original conveying direction and the first contact-glass side end of the flexible guide member 251 is pushed in the same direction as the original conveying direction by the first contact glass 154, the flexible guide member 251 on the scoop guide member 156 is moved in the same direction as the original conveying direction along the guide surface 156b according to how much it is pushed by the first contact glass 154. As a result, it is possible to prevent the original conveying path from being varied due to the flexible guide member 251 being curved such that it protrudes in the middle. Furthermore, because forced deformation such that the flexible guide member 251 is curved so that it protrudes is prevented, it is possible to prevent the flexible guide member 251 from being damaged due to the concentration of stress at an arbitrary location of the flexible guide member 251. Furthermore, the leading edge of the original that has passed by the first contact glass 154 can be conveyed to the guide surface 156b of the scoop guide member 156 without being hit against the leading edge of the scoop guide member 156, whereby it is possible to properly prevent the occurrence of a jam or a decrease in the original conveying speed.

Moreover, if the first contact glass 154 is moved in the direction opposite to the original conveying direction, a part of the flexible guide member 251 placed on the guide surface 156b of the scoop guide member 156 is pulled out from the original conveying-direction upstream end of the scoop guide member 156 while being deformed along the guide surface 156b of the scoop guide member 156. The original conveying-direction upstream end of the scoop guide member 156 is set to be almost the same level as the original conveyance surface of the first contact glass 154 in order to scoop the leading edge of the original that is conveyed on the original conveyance surface of the first contact glass 154. Furthermore, the flexible guide member 251 is deformable. Therefore, the flexible guide member 251 is pulled out substantially parallel to the original conveyance surface of the first contact glass 154 from the upstream end of the scoop guide member 156 while being deformed. As a result, the conveyed original is not scooped by a part of the flexible guide member 251 that is not opposed to the guide surface 156b of the scoop guide member 156. As a result, the variation of the original conveying path at the read position can be small depending on the sub-scanning position of the first contact glass 154. As a result, the original can be conveyed while the distance between the read surface of the conveyed original and the first-surface fixed read unit 151 is at a substantially constant state, whereby a decrease in the quality of the read images can be prevented.

Moreover, the home position is on the most downstream side in the original conveying direction in the movable range of the first contact glass 154. Thus, because the home position is on the downstream side in the original conveying direction in the movable range of the first contact glass 154, when the first contact glass 154 returns to the home position, the most area of the flexible guide member 251 is placed along the guide surface 156*b* of the scoop guide member 156. Therefore, when the ADF 51 is opened in a state where the power source is turned off, even if the user touches the flexible guide member 251, the guide surface 156*b* of the scoop guide member 156 functions as a holder so that deformation of the flexible guide member 251 is prevented.

Therefore, according to the above-described embodiment, it is determined whether the control of returning the transparent member to the home position is to be performed or not in accordance with the stop position of the original in the original conveying path. If the stop position of the original is the stop position as in FIG. 18A to FIG. 21A, the control of returning the transparent member to the home position is not performed and the transparent member is in the stopped state. Thus, it is possible to prevent the part of the original that is in contact with the transparent member from being moved with the transparent member to be jammed between the guide member and the transparent member or folded up and becomes crumpled in the conveying path. Thus, it is possible to prevent damage to the original. If the stop position of the original is not the stop position illustrated in FIG. 18(*a*) to FIG. 21(*a*), there is no possibility that the original is damaged even if the transparent member is moved; therefore, a control of moving it to the home position is performed. Thus, a control of returning it to the home position does not need to be performed when images of a subsequent original are read after an event causing the interruption of original conveyance is resolved, and therefore it is possible to start an operation for reading the original in a smoother manner.

Furthermore, it is determined whether a control of returning the transparent member to the home position is to be performed or the movement of the transparent member is to be stopped in accordance with the moving direction of the transparent member when an event causing the interruption of original conveyance occurs. If the moving direction of the transparent member when the event causing the interruption of the original conveyance occurs is in the direction opposite to the moving direction during the image reading, it is the time to move it to read the images of a subsequent original after the reading of the images of the original is finished. Therefore, at least the rear edge of the original has passed through the read position.

Furthermore, because a subsequent original is conveyed to the read position after the transparent member is moved in the direction opposite to the moving direction during the image reading and reaches a predetermined position, the leading edge of the original is not located in the vicinity of the read position during the movement in the opposite direction. Therefore, although it is considered that the original is in the stopped state in FIG. 18A or FIG. 19A, the original is not stopped in the state in FIG. 20A or FIG. 21A.

Furthermore, in the above descriptions, because the home position of the transparent member is at the most upstream position in the original conveying direction in the movable range of the transparent member, when a control of returning the transparent member to the home position is performed, the transparent member is moved in the direction opposite to the original conveying direction. Therefore, even if a control of returning the transparent member to the home position is performed in a state where the original is stopped as in FIG. 18A or FIG. 19A, the original is not folded up and crumpled in the conveying path nor is the original damaged, as illustrated above in FIG. 18B or FIG. 19B. Moreover, because the rear edge of the original is located on the original conveying-direction downstream side from the read position, even if the rear edge of the original is moved in the direction opposite to the original conveying direction together with the transparent member, the original is fully stretched before the rear edge of the original enters between the transparent member and the cover member. Therefore, as illustrated in FIG. 21B, the rear edge of the original is not jammed between the transparent member and the cover member.

Therefore, if the moving direction of the transparent member upon occurrence of an event causing the interruption of original conveyance is opposite to the moving direction during reading of an original, it is determined that a control of returning it to the home position is to be performed so that the original will not be damaged. Thus, a control of returning it to the home position does not need to be performed when images of a subsequent original are read after an event causing the interruption of original conveyance is resolved, and therefore it is possible to start an operation for reading the original in a smoother manner.

On the other hand, if the moving direction of the transparent member upon occurrence of an event causing the interruption of original conveyance is the moving direction during reading of the original, the original is passing through the read position or the original is moving toward the read position. Therefore, at that time, there is a possibility that it is in the state in FIG. 18A or the state in FIG. 19A. Thus, if the moving direction of the transparent member upon occurrence of an event causing the interruption of original conveyance is the moving direction during reading of the original, it is determined that the transparent member is to be stopped so that the damage to the original can be prevented.

According to the present invention, it is determined whether a control of returning the transparent member to the home position is to be performed or not in accordance with the stopped position of the original in the original conveying path. The control of returning the transparent member to the home position is not performed so that the transparent member is in the stopped state. Thus, it is possible to prevent the part of the original that is in contact with the transparent member from being moved together with the transparent member and jammed in the gap between the guide member and the transparent member and prevent the original from being folded up and becoming crumpled in the conveying path. Thus, damage to the original can be prevented. If the stop position of the original is not the stop position, there is no possibility that the original is damaged even if the transparent member is moved; therefore, a control of moving it to the home position is performed. Thus, a control of returning it to the home position does not need to be performed when images of a subsequent original are read after an event causing the interruption of original conveyance is resolved, and therefore an effect such that it is possible to start an operation for reading the original in a smoother manner can be obtained.

According to the present invention, if the moving direction of the transparent member upon occurrence of an event causing the interruption of original conveyance is opposite to the moving direction during reading of an original, it is determined that a control of returning it to the home position is to be performed so that the original will not be damaged. Thus, a control of returning it to the home position does not need to be performed when images of a subsequent original are read after an event causing the interruption of original conveyance is resolved, and therefore it is possible to start an operation for reading the original in a smoother manner.

On the other hand, if the moving direction of the transparent member upon occurrence of an event causing the interruption of original conveyance is the moving direction during reading of the original, the original is passing through the read position or the original is moving toward the read position. Thus, if the moving direction of the transparent member upon occurrence of an event causing the interruption of original conveyance is the moving direction during reading of the original, it is determined that the transparent member is to be stopped so that an effect such that the damage to the original can be prevented can be obtained.

The invention claimed is:

1. An image read device that conveys an original while performing reading of an image of the original at a read position on a transparent member by a read unit fixed, the image read device comprising:
   a moving unit configured to move the transparent member back and forth in an original conveying direction;
   a control unit configured to convey the original and move the transparent member by using the moving unit while causing the reading of the image to be performed at the read position;
   a plurality of original detection sensors configured to detect presence or absence of the original in a original conveying path; and
   a determining unit that, when an event causing interruption of original conveyance occurs, is configured to instruct the control unit to stop the transparent member and configured to determine whether the control unit should return the transparent member to a home position or not based on a stopped position of the original in the original conveying path using detection results of an upstream-side original detection sensor that is located closest to the read position among upstream-side original detection sensors in the original conveying detection from the read position and a downstream-side original detection sensor that is located closest to the read position among downstream-side original detection sensors in the original conveying direction from the read position.

2. The image read device according to claim 1, wherein if any one of the upstream-side original detection sensor that is located closest to the read position and the downstream-side original detection sensor that is located closest to the read position detects presence of the original, the determining unit determines that the control of returning the transparent member to the home position is not to be performed.

3. The image read device according to claim 1, wherein if both of the upstream-side original detection sensor that is located closest to the read position and the downstream-side original detection sensor that is located closest to the read position detect presence of the original, the determining unit determines that the control of return the transparent member to the home position is not to be performed.

4. An image read device that conveys an original while performing reading of an image of the original at a read position on a transparent member by a read unit fixed, the image read device comprising:
   a moving unit configured to move the transparent member back and forth in an original conveying direction;
   a control unit configured to convey the original and move the transparent member by using the moving unit while causing the reading of the image to be performed at the read position;
   a plurality of original detection sensors configured to detect presence or absence of the original in an original conveying path; and
   a determining unit configured to determine whether the control unit should return the transparent member to a home position or to stop movement of the transparent member, based on a moving direction of the transparent member when an event causing interruption of original conveyance occurs, using detection results of an upstream-side original detection sensor located closest to the read position among upstream-side original detection sensors in the original conveying direction from the read position and a downstream-side original detection sensor located closest to the read position among downstream-side original detection sensors in the original conveying direction from the read position, if a home position of the transparent member is at a most upstream position in the original conveying direction in a movable range of the transparent member.

5. The image read device according to claim 4, wherein the determining unit determines that the control of returning the transparent member to the home position is to be performed if the moving direction of the transparent member when the event causing the interruption of original conveyance occurs is in a direction opposite to a moving direction during the reading of the image.

6. The image read device according to claim 1, further comprising:
   an original conveying device that is attached in an openable and closable manner to a scanner unit that includes at least the read unit, the transparent member, and the moving unit and conveys the original to the read position,
   wherein the determining unit determines whether the control of returning the transparent member to the home position is to be performed or not by using open/close information of the original conveying device.

7. The image read device according to claim 1, further comprising a flexible guide member whose original conveying-direction upstream end is in contact with the transparent member and whose original-conveying direction downstream end is movably placed on a guide surface of a guide member that scoops up a leading edge of the original so as to guide the conveyed original from the transparent member to the scooping guide member, wherein
   when the transparent member is moved in the direction opposite to the original conveying direction, the flexible guide member moves such that a part of the flexible guide member placed on the guide surface of the scooping guide member is pulled out from a original conveying-direction upstream end of the scoop guide member while being deformed along the guide surface of the scooping guide member.

8. The image read device according to claim 7, wherein the home position of the transparent member is on a most downstream side in the original conveying direction in a movable range of the transparent member.

9. A copier comprising an image forming unit that forms an image on a recording medium and an original conveying reading unit that conveys an original while reading an image of the original, the copier forming the image read by the original conveying reading unit on the recording medium by using the image forming unit, thereby making a copy of the original, wherein
   the copier uses the image read device according to claim 1 as the original conveying reading unit.

* * * * *